United States Patent [19]

Hayashi et al.

[11] Patent Number: 5,724,152
[45] Date of Patent: Mar. 3, 1998

[54] IMAGE READING APPARATUS AND IMAGE PROCESSING APPARATUS FOR READING OPTICAL INFORMATION OF VISIBLE AND NON-VISIBLE LIGHT

[75] Inventors: Toshio Hayashi, Kawasaki; Hiroshi Tanioka; Shinobu Arimoto, both of Yokohama; Kazuo Yoshinaga, Machida; Takehiko Nakai, Tokyo; Tsutomu Utagawa, Yokohama; Tetsuya Nagase, Kawasaki; Nobuatsu Sasanuma, Yokohama, all of Japan

[73] Assignee: Canon Kabushiki Kaisha, Tokyo, Japan

[21] Appl. No.: 174,435

[22] Filed: Dec. 28, 1993

[30] Foreign Application Priority Data

Jan. 1, 1993 [JP] Japan ................... 5-015083
Jan. 1, 1993 [JP] Japan ................... 5-015096

[51] Int. Cl.$^6$ .................... H04N 1/21; B41J 2/47; G01D 15/14; G02B 26/00
[52] U.S. Cl. .................... 358/296; 347/241
[58] Field of Search .................... 358/296, 298; 347/241

[56] References Cited

U.S. PATENT DOCUMENTS

| | | | |
|---|---|---|---|
| 4,663,656 | 5/1987 | Elabd et al. | 358/513 |
| 4,748,480 | 5/1988 | Jacobs et al. | 355/133 |
| 4,791,469 | 12/1988 | Ohmi et al. | 257/462 |
| 5,083,161 | 1/1992 | Borton et al. | 399/49 |
| 5,140,411 | 8/1992 | Haneda et al. | 358/518 |
| 5,161,233 | 11/1992 | Matsuo et al. | 399/136 |

FOREIGN PATENT DOCUMENTS

| | | |
|---|---|---|
| 302230 | 2/1989 | European Pat. Off. |
| 382549 | 8/1990 | European Pat. Off. |
| 410700 | 1/1991 | European Pat. Off. |
| 463804 | 1/1992 | European Pat. Off. |
| 493961 | 7/1992 | European Pat. Off. |
| 4011281 | 10/1990 | Germany . |
| 62-174716 | 7/1987 | Japan . |
| 63-167577 | 7/1988 | Japan . |
| 2078368 | 1/1982 | United Kingdom . |

*Primary Examiner*—Mark J. Reinhart
*Assistant Examiner*—Raquel Yvette Gordon
*Attorney, Agent, or Firm*—Fitzpatrick, Cella, Harper & Scinto

[57] ABSTRACT

To properly cut light except for visible light and improve read precision, there is provided an image reading apparatus having a plurality of photoelectric conversion elements. The image reading apparatus includes an image information detecting unit in which the photoelectric conversion elements are arranged on a single chip, a first light-shielding unit, arranged near the photoelectric conversion elements, for transmitting specific visible light, and a second light-shielding unit, arranged near the photoelectric conversion elements at a position different from that of the first light-shielding unit, for partially shielding light except for the visible light.

26 Claims, 37 Drawing Sheets

SEE FIG. 7B

MAIN SCANNING DIRECTION

MAIN SCANNING DIRECTION

IMAGE READING APPARATUS AND IMAGE PROCESSING APPARATUS FOR READING OPTICAL INFORMATION OF VISIBLE AND NON-VISIBLE LIGHT

BACKGROUND OF THE INVENTION

1. Field of the Invention

The present invention relates to an image reading apparatus for reading optical information of visible light and light except for the visible light.

2. Related Background Art

There has been conventionally the possibility that banknotes, stamps, and securities are counterfeited along with the development of a high-quality color copying machine. Various schemes for recognizing banknotes, such as a method of detecting the seal pattern of a banknote, have been proposed.

There is also proposed a scheme for recognizing a banknote or the like from the hue of an original because the pattern of the original is expressed with a specific hue.

There is further proposed a scheme for printing a specific mark on a banknote with a fluorescent ink for emitting invisible light upon radiation of an ultraviolet ray on the banknote, thereby discriminating an authentic banknote from a counterfeit banknote.

There is further proposed a scheme for detecting an infrared absorption characteristic ink used in securities to judge authentic securities.

There is provided an apparatus for detecting the infrared ray, wherein a read sensor for forming a normal color image and a read sensor for detecting an infrared ray are monolithically arranged to use a common optical system, thereby achieving compactness and facilitating optical adjustment.

When the infrared information read sensor and the visible color information read sensor are monolithically arranged on a single chip, color separation filters arranged on the visible color information read sensor must also have a function of cutting off unnecessary infrared information, as filed in a prior-art application by the present applicant on Oct. 20, 1993. In this prior-art application, a dyed gelatin materials or pigment-dispersed materials are used for the color separation filters constituting the sensor surface.

When these pigments or dyes are used to arrange R, G, and B filters having infrared absorption properties, color turbidity occurs in the R, G, and B color separation characteristics upon detection of visible light, and the R, G, and B color separation characteristics are degraded.

In addition, when the infrared information read sensor and the visible color read Sensor are monolithically arranged on a single chip, for example, a sensor assembly becomes bulky depending on the layout of sensors, and an arrangement for correcting shifts between the read positions of the sensors becomes bulky.

SUMMARY OF THE INVENTION

It is an object of the present invention, in consideration of the conventional problems described above, to provide an image reading apparatus for properly cutting off light except for visible light to improve read precision.

It is another object of the present invention to provide an image reading apparatus capable of reading visible light and light except for the visible light with a simple arrangement.

In order to achieve the above objects according to an aspect of the present invention, there is disclosed an image reading apparatus comprising:

image information detecting means in which photoelectric conversion elements arranged on a single chip;

first light-shielding means, arranged near the photoelectric conversion element, for transmitting specific visible light; and second light-shielding means, arranged near the photoelectric conversion element at a position different from that of the first light-shielding means, for partially shielding light except for the visible light.

The above and other objects, features, and advantages of the present invention will be apparent from the following detailed description in conjunction with the accompanying drawings.

DETAILED DESCRIPTION OF THE PREFERRED EMBODIMENTS

<First Embodiment>

The present invention will be described with reference to a preferred embodiment hereinafter.

The following embodiment will exemplify a copying machine as an application of the present invention. However, the present invention is not limited to this. The present invention is also applicable to various apparatuses such as an image scanner.

Figure 2:
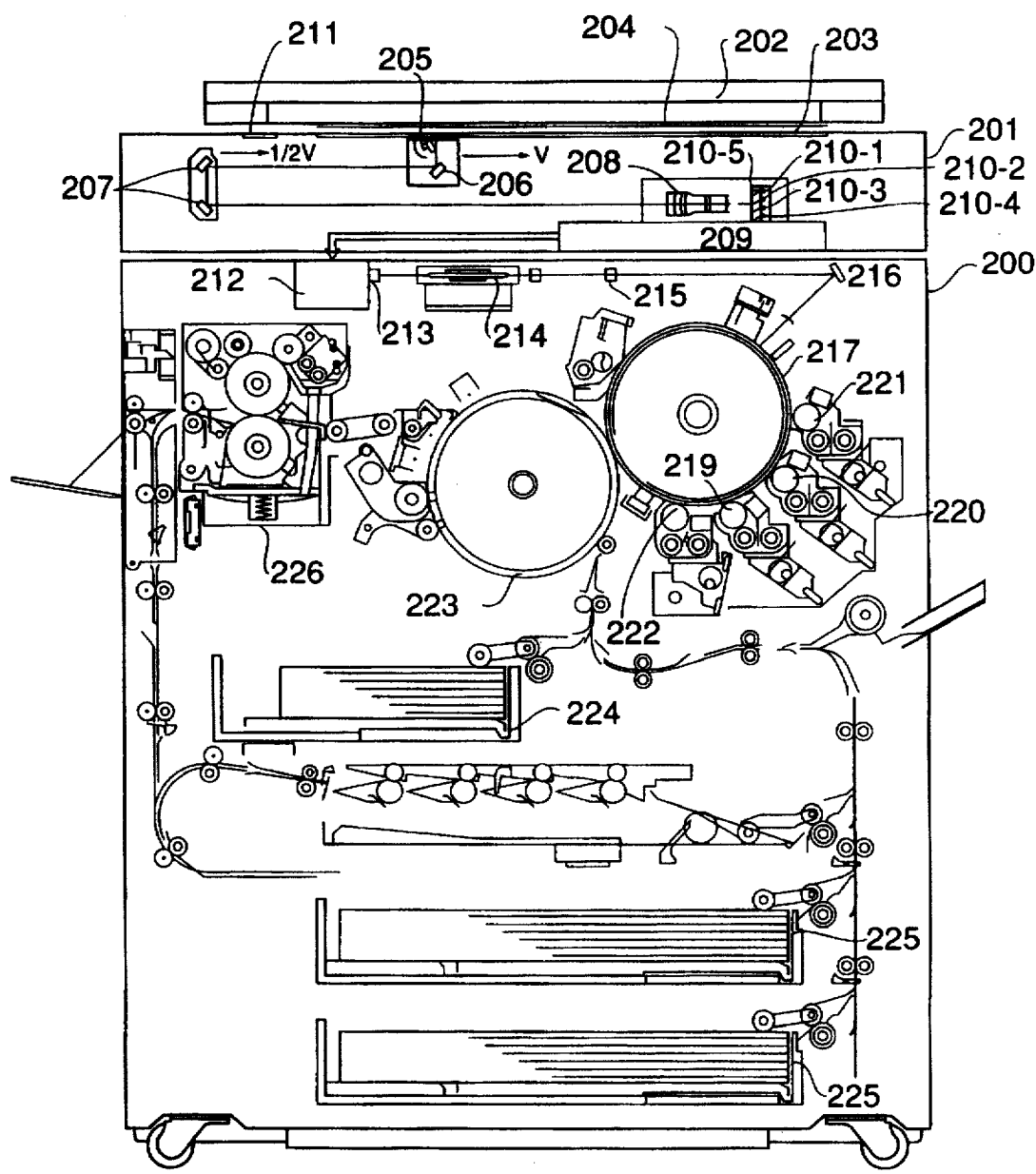
FIG. 2 is a view showing a color copying machine using the present invention.

FIG. 2 is a view showing the apparatus according to the first embodiment of the present invention.

Referring to FIG. 2, an image scanner unit 201 reads an original and performs digital signal processing. A printer unit 200 prints and outputs, on a paper sheet, a full-color image corresponding to the original image read by the image scanner unit 201.

In the image scanner unit 201, an original press plate 202 is used to fix an original 204 on an original table glass (to be referred to as a platen hereinafter) 203. The original 204 is irradiated with light from a halogen lamp 205. Light reflected by the original 204 is guided to mirrors 206 and 207 and is focused through the lens 208 to form an image on a 4-line sensor (to be referred to as a CCD hereinafter) 210 constituted by four CCD line sensors. The CCD 210 color-separates optical information from the original and sends red (R), green (G), blue (B), and infrared information (IR) components of the full-color information to a signal processing unit 209. The halogen lamp 205 and the mirror 206 are mechanically moved in a direction (to be referred to as a subscanning direction hereinafter) perpendicular to an electrical scanning direction (to be referred to as a main scanning direction hereinafter) of the line sensors at a speed v, and the mirror 207 is moved in the same direction as that of the halogen lamps 205 and the mirror 206 at a speed v/2, thereby scanning the entire surface of the original.

A standard white board 211 is used to generate data for correcting read data respectively corresponding to sensors 210-1 to 210-4 as IR, R, G, and B component line sensors in shading correction.

Figure 8:
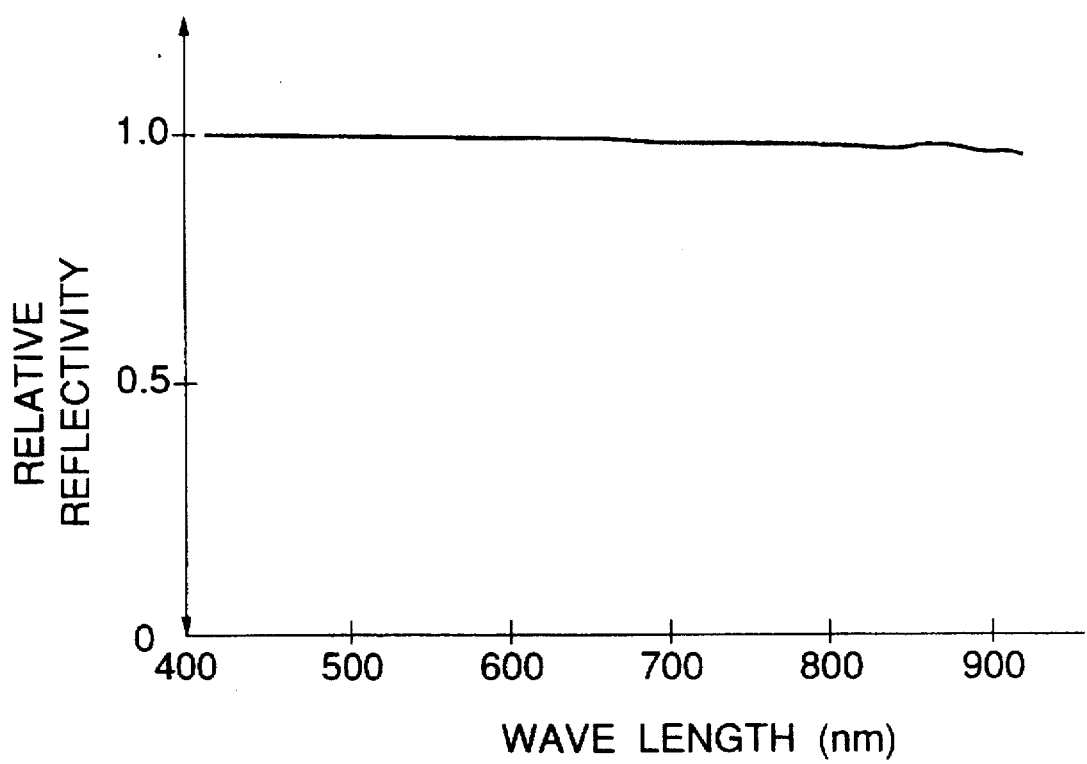
FIG. 8 is a graph showing the spectral reflectivity of a standard white board.

This standard white board has almost uniform reflectivity characteristics for light ranging from visible light to the infrared rays, as shown in FIG. 8 and is visually observed in white.

This standard white board is used to correct output data from the IR sensor 210-1 for the infrared ray and output data from the visible light sensors 210-2 to 210-4 for the R, G, and B components.

The signal processing unit 209 electrically processes the read signal and color-separates it into magenta (M), cyan (C), yellow (Y), and black (BK) components. These components are then sent to the printer unit 200. One of the M, C, Y, and BK components is surface-sequentially sent to the printer unit 206 in accordance with one original scanning cycle of the image scanner unit 201. A color image is formed by a total of four original scanning cycles.

The M, C, Y, and BK image signals sent from the image scanner unit 201 are sent to a laser driver 212. The laser driver 213 modulates and drives a semiconductor laser 213 in accordance with image signals. A laser beam scans the surface of a photosensitive drum 217 through a polygon mirror 214, an f-θ lens 215, and a mirror 216.

Developing units 219 to 222 comprise the magenta developing unit 219, the cyan developing unit 220, the yellow developing unit 221, and the black developing unit 222. The four developing units are sequentially brought into contact with the photosensitive drum to develop the M, C, Y, and BK latent images formed on the photosensitive drum 217 with the corresponding toners.

A transfer drum 223 winds a paper sheet fed from a paper cassette 224 or 225 on a transfer drum 223 and transfers the toner images from the photosensitive drum 217 to the paper sheet.

The M, C, Y, and BK color images are sequentially transferred onto the paper sheet, and the paper is fixed by a fixing unit 226. The fixed sheet is then discharged outside the apparatus.

The halogen lamp 205 is used to read visible light information and infrared information. The halogen lamp 205 has illumination wavelength components required for reading these pieces of optical information. In this manner, the common illumination system is used to effectively illuminate the original with illumination light components having different wavelength components for reading the visible and infrared components.

Figure 7A:
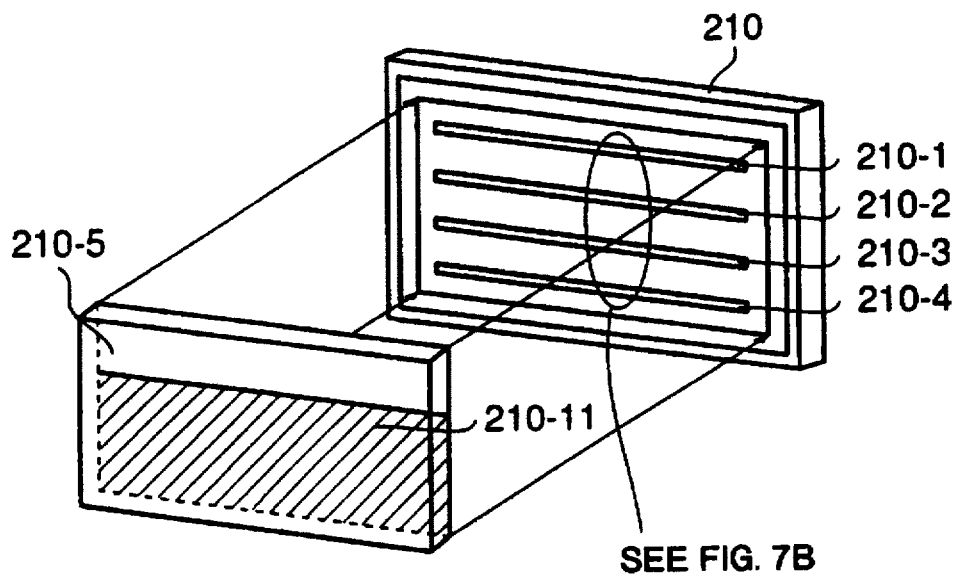
FIGS. 7A and 7B are views showing the structure of the CCD of the first embodiment.

FIG. 7A shows the structure of the CCD 210 used in this embodiment.

The IR line sensor 210-1 comprises a light-receiving element array for reading an infrared ray (IR), and the R, G, and B line sensors 210-2, 210-3, and 210-4 comprise light-receiving element arrays for reading the R, G, and B wavelength components, respectively.

Each of the IR, R, G, and B sensors 210-1 to 21-4 has an opening having a size of 10 μm in both the main scanning and subscanning directions.

The four light-receiving element arrays having different optical characteristics are monolithically and parallelly formed on a single silicon chip so that the IR, R, G, and B sensors can read the same line.

When the CCD having the above arrangement is used, a common optical system such as a lens can be used to read the visible light and the infrared ray.

With the above structure, precision as in optical adjustment can be improved, and the adjustment can be facilitated.

A glass plate 210-5 has infrared cut characteristics in its hatched portion and has a thickness of about 300 μm.

Figure 11:
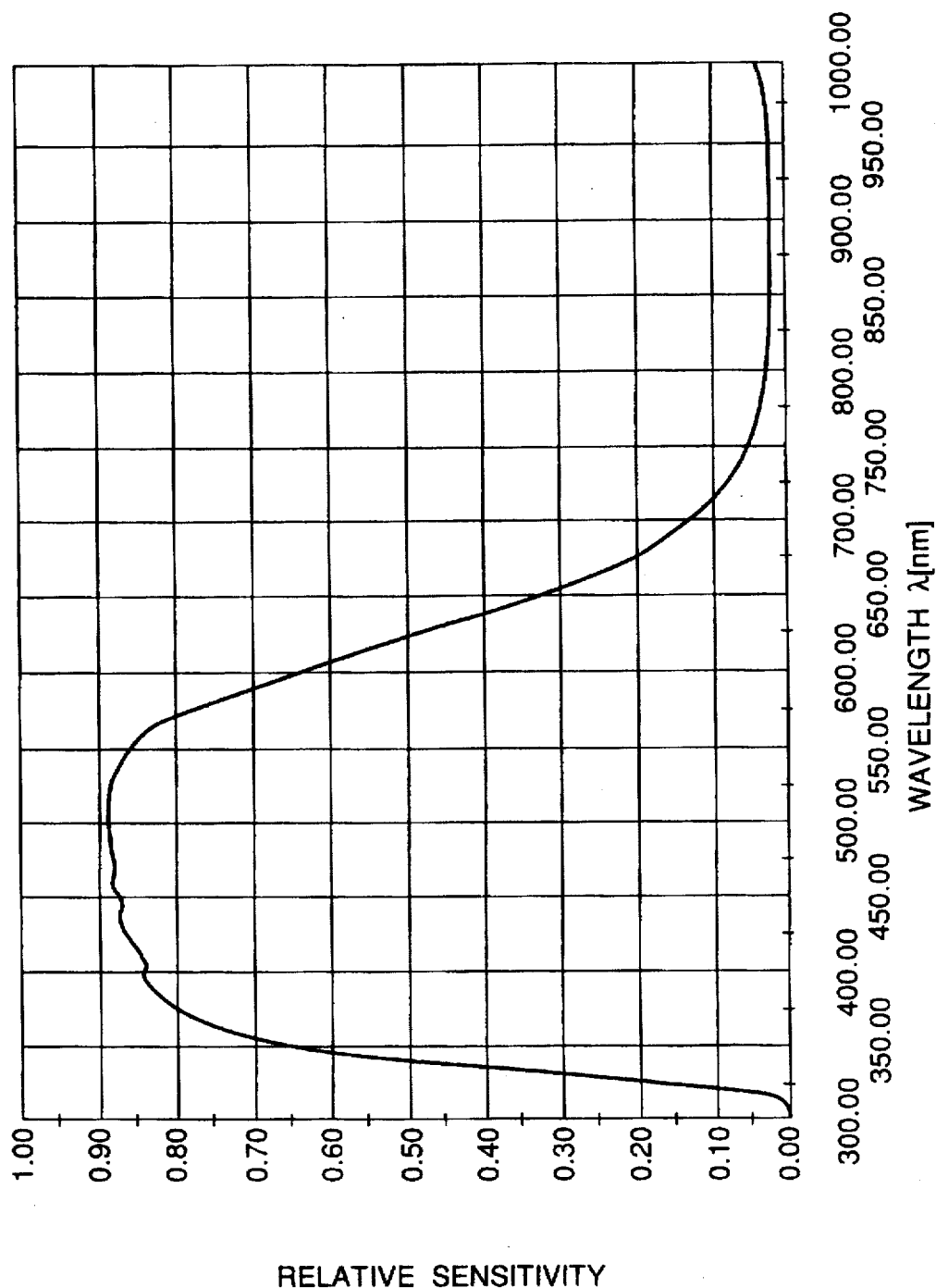
FIG. 11 is a graph showing the characteristics of an infrared cut dichroic filter.

The infrared Cut characteristics of the hatched portion are obtained by a dichroic mirror 210-11 formed by a deposition film 210-11. The infrared cut characteristics are shown in FIG. 11.

In this case, the glass plate is adhered to the chip surface such that the deposition surface faces the sensor side.

Figure 7B:
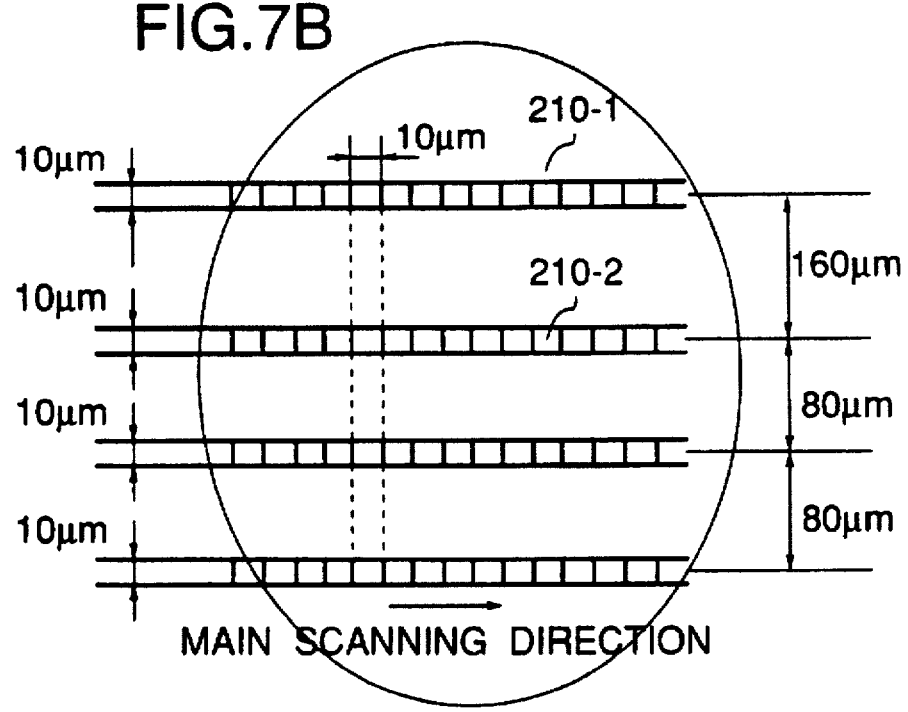

FIG. 7B is an enlarged view of the light-receiving elements. Each sensor has a length of 10 μm per pixel in the main scanning direction. Each sensor has 500 pixels in the main scanning direction so that an image of an A3-size original is read at a resolution of 400 dpi (dots per inch) in the widthwise direction (297 mm). An interval between the R, G, and B line sensors is 80 μm, and these sensors are spaced apart from each other by eight lines with respect to a subscanning resolution of 400 dpi.

The interval or distance between the IR sensor 210-1 and the R sensor 210-2 is twice (160 μm or 16 lines) that between the remaining sensors. In this manner, when the interval between the IR sensor 210-1 and the R sensor 210-2 is larger than that between the remaining sensors, the mounting precision of the glass plate 210-5 with respect to the sensor chip surface need not be strict when the deposition surface of the deposition film 210-11 of the glass plate 210-5 is caused to correspond to the sensors 210-2 to 210-4, and the non-deposition surface is caused to correspond to the sensor 210-1.

Figure 1:
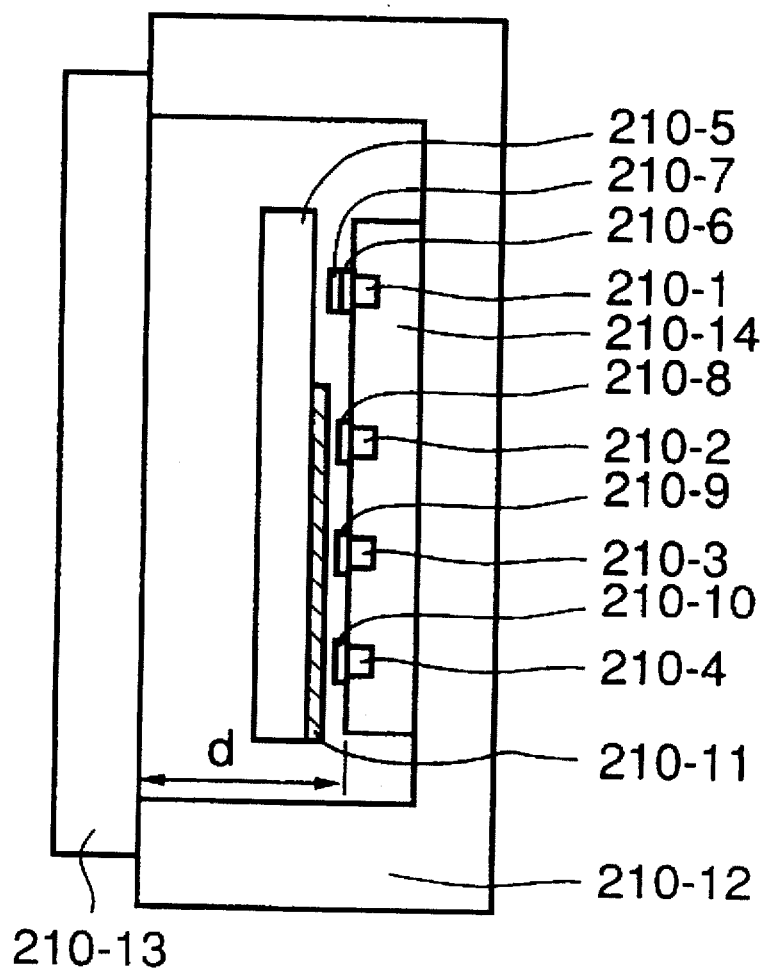
FIG. 1 is a view showing the structure of a CCD in the first embodiment.

FIG. 1 is a cross-sectional view of the sensors used in this embodiment.

The line sensors 210-1 to 210-4 are monolithically formed on a common silicon chip 210-14, and optical filters 210-6 to 210-10 for obtaining predetermined IR, R, G, and B spectral characteristics are formed on the surfaces of the corresponding line sensors. The pigment filters 210-8, 210-9, and 210-10 transmit R, G, and B wavelength components therethrough, so that R, G, and B read signals are obtained from the sensors 210-2, 210-3, and 210-4, respectively. The R filter 210-6 having the same optical characteristics as those of the R filter 210-8 and the B filter 210-7 having the same optical characteristics as those of the B filter 210-10 are stacked on the IR sensor 210-1. Only an IR ray having a wavelength of 750 nm or more can be read by the combination of the R and B filter characteristics.

Figure 13:
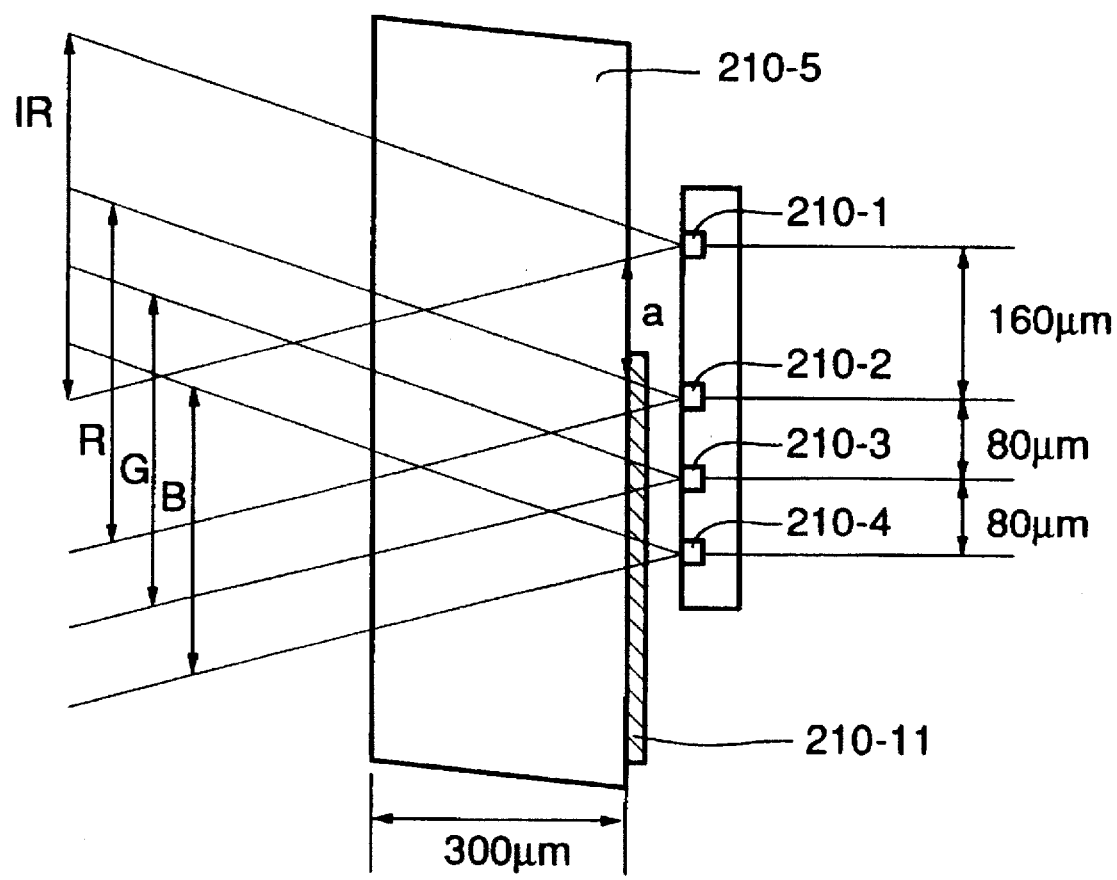
FIG. 13 is a view showing the mounted state of an infrared cut glass with respect to a CCD sensor.

The glass plate 210-5 is mounted near the surface of the sensor, and the deposition film 210-11 for shielding the infrared ray faces the sensor side because light incident on the sensor is focused by the lens 209, as shown in FIG. 13 and beams incident on the sensors are superposed on each other at a position away from the sensor surface. That is, when the infrared cut filter (the deposition film) 210-11 is operated for only light components incident on the sensors 210-2 to 210-4, the infrared cut filter 210-11 must be mounted at a portion near the sensor where the IR ray is not superposed on the R component.

Since the infrared cut filter 210-11 is located near the surface of the sensor, the IR beam is not shielded by the IR filter, so that an allowable mounting width a for forming the deposition film can be increased. When the glass plate 210-13 is to be mounted on the sensor chip with the IR cut filter 210-11 being adhered to the glass plate 210-13, the mounting precision of the glass plate 210-13 with respect to the sensor chip need not be strict.

When the infrared cut filter is mounted on the surface of the glass plate 210-5 on the side opposite to the sensor, the IR beam is superposed on the R beam. For this reason, when the infrared cut filter is arranged with a sufficient margin with respect to the R beam, most of the IR beam focused on the IR sensor 210-1 is shielded to undesirably lower the IR signal level.

Figure 14:
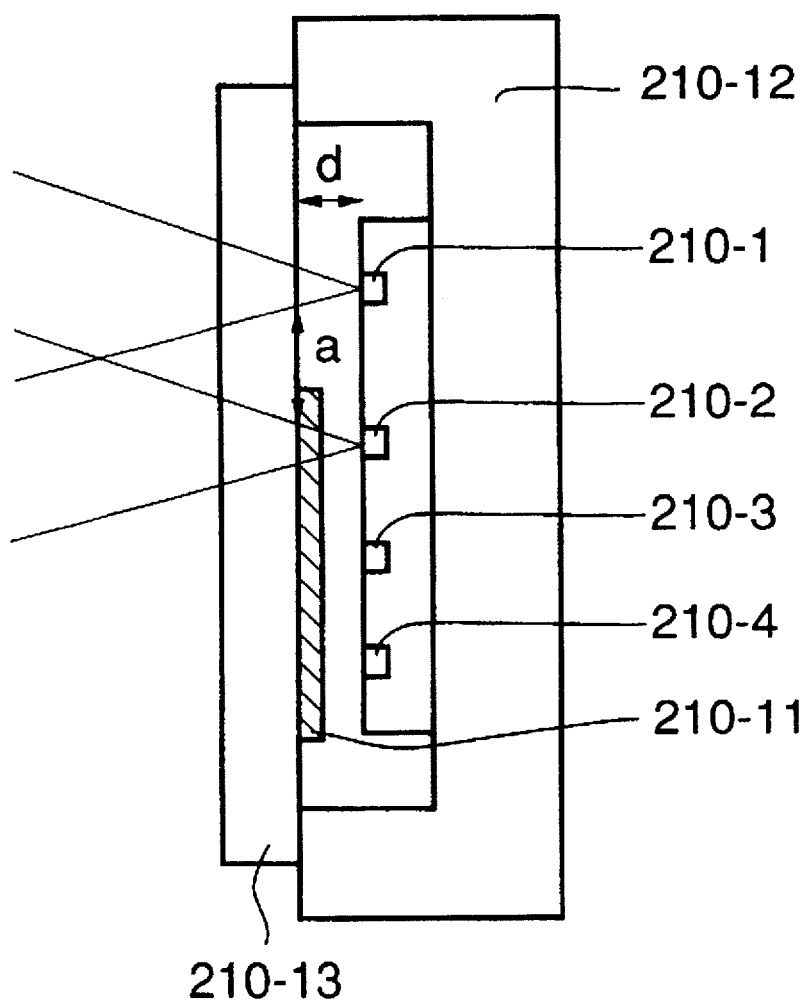
FIG. 14 is a view showing the mounted state of a cover glass when an infrared cut filter is formed on the cover glass of the CCD.

The infrared cut filter 210-11 may be formed on the surface of a cover glass 210-13 on the sensor side in place of mounting the glass plate 210-5 as shown in FIG. 14. In this case, a ceramic package 210-12 of the CCD sensor is arranged so that a distance d between the sensor surface and the inner surface of the glass cover is sufficiently small, thereby almost preventing the infrared cut filter 210-11 formed on the inner surface of the cover glass from shielding the IR beam.

The spectral characteristics of the filters of the IR, R, G, and B line sensors of the CCD 210 will be described with reference to FIG. 10.

A characteristic curve R represents the characteristics of outputs from the sensors using the filters 210-8 and 210-6. The characteristic curve R represents sensitivities for light in the red and infrared wavelength ranges. A characteristic curve G represents the characteristics of an output from the sensor using the filter 210-9. The characteristic curve G represents sensitivities for light in the green and infrared wavelength ranges. A characteristic curve B represents the characteristics of sensors using the characteristic filter 210-10 and the filter 210-7. The characteristic curve B represents sensitivities for light in the blue and infrared wavelength ranges.

Figure 10:
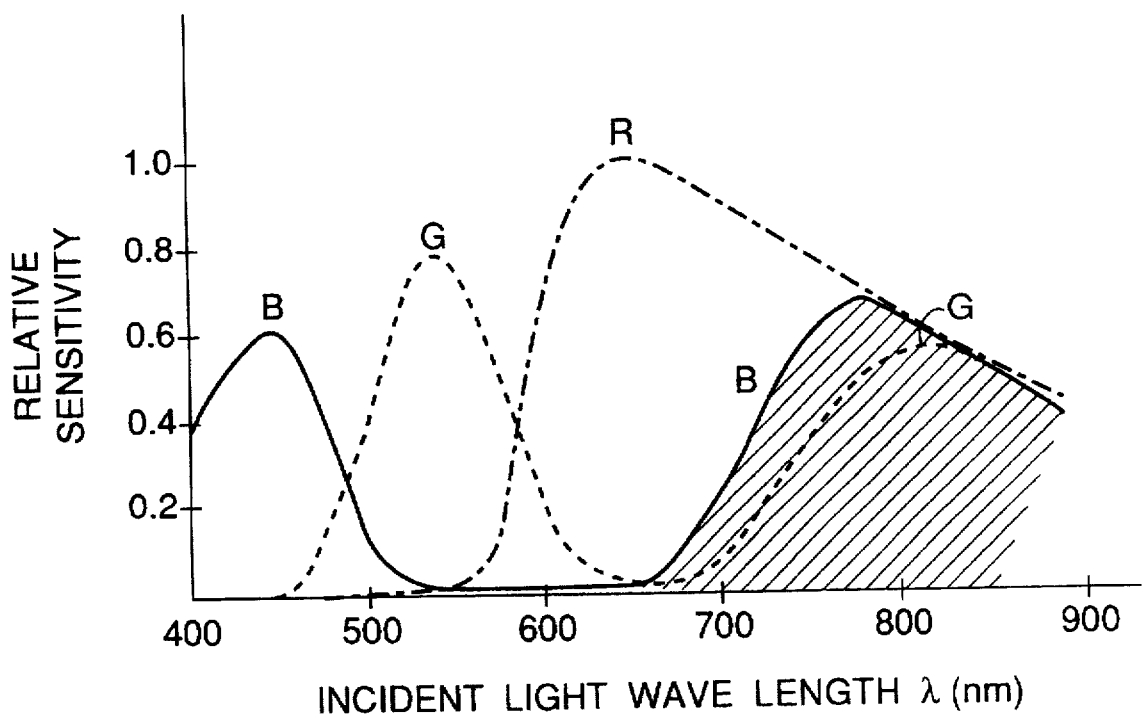
FIG. 10 is a graph showing the spectral sensitivity characteristics of a visible light line sensor and the characteristics of a filter for an infrared read sensor.

Since the filters 210-6 and 210-7 are stacked on the IR sensor 210-1, this sensor has a sensitivity for light in the infrared range indicated by a hatched portion in FIG. 10.

As can be apparent from FIG. 10, the R, G, and B filters 210-8 to 210-10 have sensitivities for infrared rays having wavelengths of 700 nm or more. For this reason, the infrared cut filter 210-11 has the characteristics shown in FIG. 11.

Figure 9:
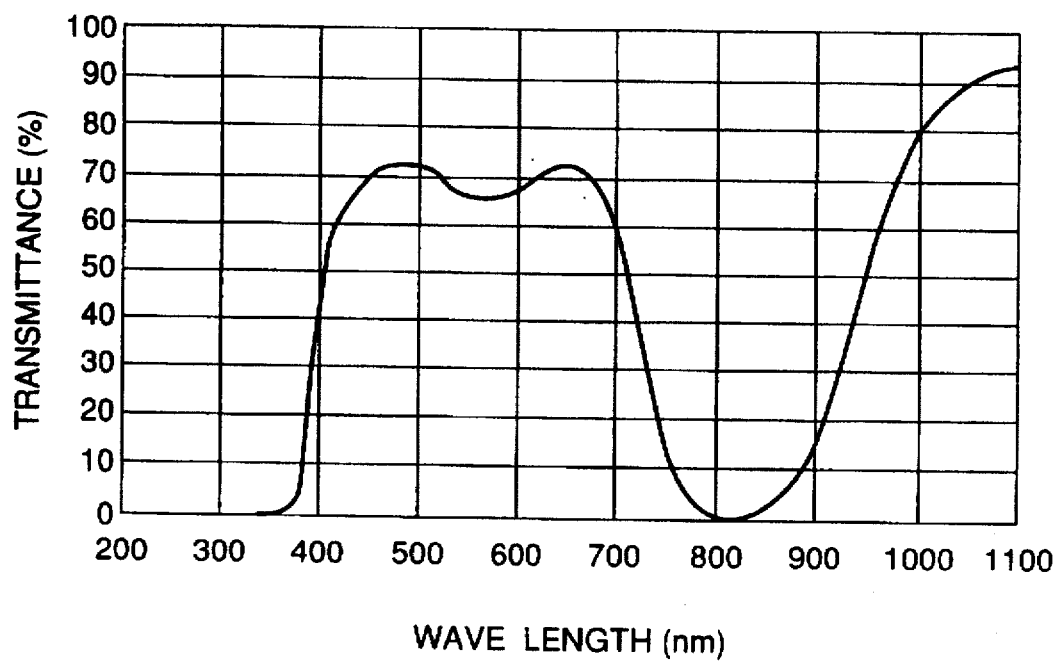
FIG. 9 is a graph showing the spectral transmittance of the specific pattern.

The spectral absorptivity of an infrared absorber SIR-159 available from Mitsui Toatsu Chemicals, Inc. used for a detection mark of a specific original in this embodiment is shown in FIG. 9. In this embodiment, to cause the IR sensor to detect the presence/absence of this infrared absorber, the IR sensor detects only infrared rays in the wavelength range of 750 nm to 850 nm.

Figure 12:
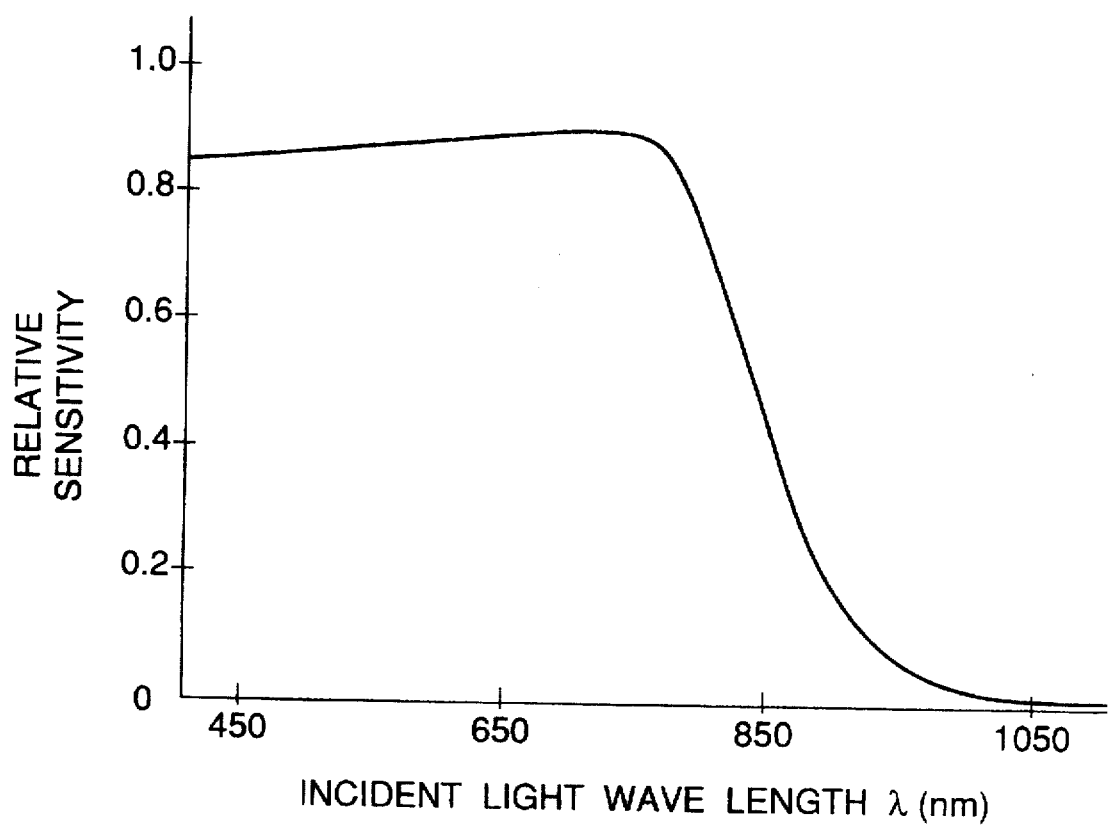
FIG. 12 is a graph showing the characteristics of a far-infrared cut filter.

For this purpose, a far-infrared cut filter constituted by a dichroic mirror shown in FIG. 12 is provided to the lens 209. This filter does not adversely affect not only the IR sensor 210-1 but also the R, G, and B sensors 210-2 to 210-4 and is arranged in a lens portion common to the visible and infrared components. With this arrangement, a filter mounted on the lens 209 can be used only in consideration of infrared cut characteristics. Therefore, good far-infrared cut characteristics can be realized with a simple interference film.

Figure 15:
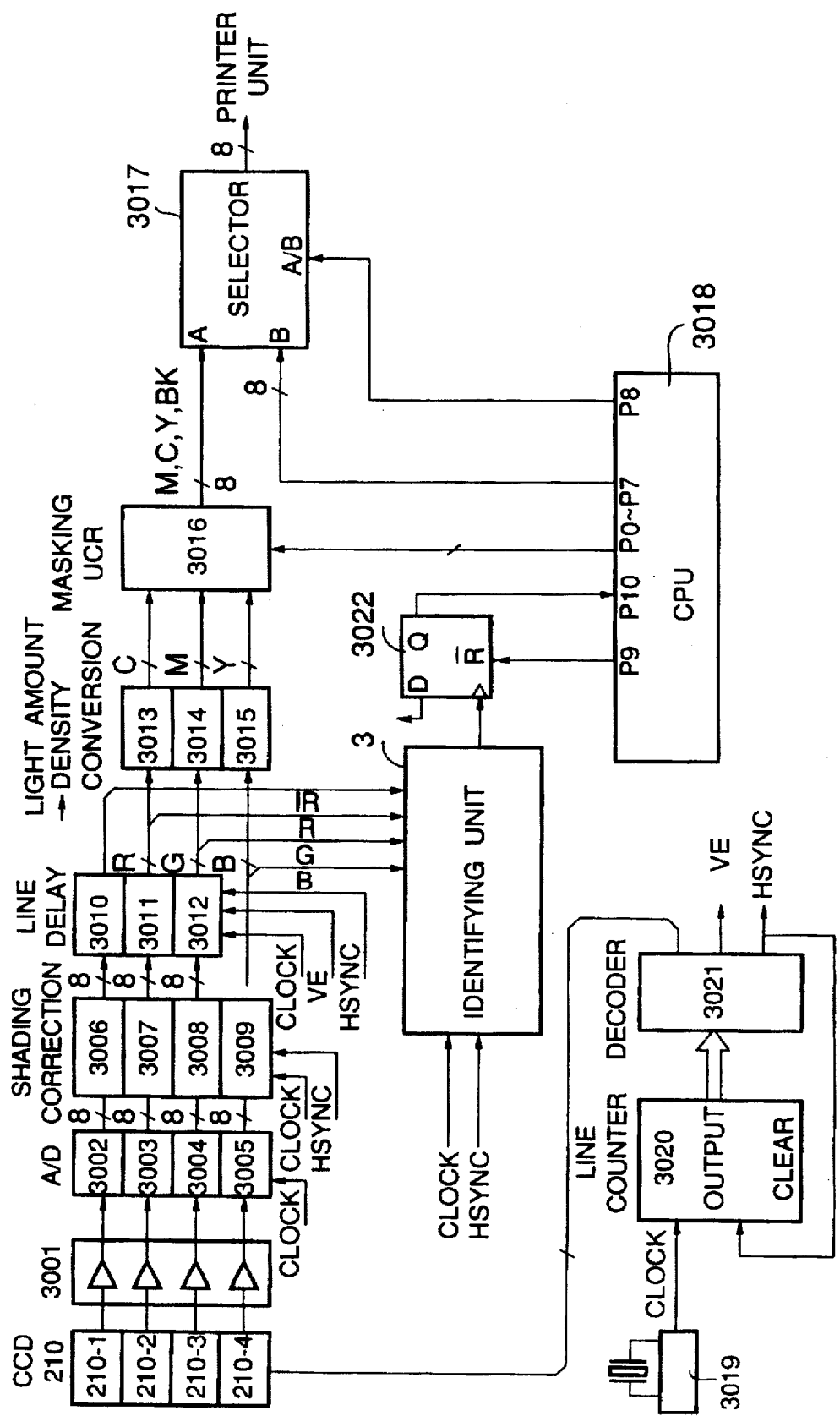
FIG. 15 is a block diagram of an image signal control unit.

FIG. 15 is a block diagram showing the flow of an image signal in the image scanner unit 201. An image signal output from the CCD 210 is input to an analog signal processing unit 3001, so that the gain and offset of the image signal are adjusted therein. An output from the analog signal processing unit 3001 is input to A/D converters 3002 to 3005, so that the image signal is converted into 8-bit digital image signals of the respective color components. These signals are then input to shading correction units 3006 to 3009, so that known shading correction using a read signal from the standard white board 211 is performed for each color component.

A clock generation unit 3019 generates a clock per pixel. A line counter 3020 counts clocks and generates a pixel address output per line. A decoder 3021 decodes a main scanning address from a main scanning address counter 3020 to generate a CCD drive signal per line such as a shift pulse and a reset pulse, a VE signal representing the valid area in a one-line read signal from the CCD, and a line sync signal HSYNC. The counter 3020 is cleared in response to the HSYNC signal and starts counting the main scanning address of the next line.

As shown in FIG. 1, the light-receiving element arrays 210-1, 210-2, 210-3, and 210-4 are spaced apart from each other at the predetermined intervals, spatial shifts in the subscanning direction are corrected line delay elements 3010, 3011, and 3012. More specifically, the IR, R, and B signals obtained by reading the downstream original information in the subscanning direction with respect to the B signal are delayed by lines in the subscanning direction and are matched with the B signal.

Light amount/density conversion units 3013, 3014, and 3015 comprises a look-up table ROM to convert a luminance signal of the R, G, and B components into a density signal of the C, M, and Y components. A known masking/UCR circuit 3016 receives the three primary (Y, M, and C) signals and outputs Y, M, C, and BK 8-bit signals sequentially every time the read cycle is repeated, and a detailed description thereof will be omitted.

An identifying unit 3 detects a specific pattern in an original.

A CPU 3018 performs sequence control such as control of an original reading optical system and ON/OFF control of the original illumination lamp or halogen lamp 205, and Generates a pixel interval signal VSYNC in the subscanning direction. The CPU 3018 also controls a selector 3017 in accordance with the identification result from the identifying unit 3 and outputs a port output in place of the read signal, thereby inhibiting the copy operation of a specific original.

Figure 16:
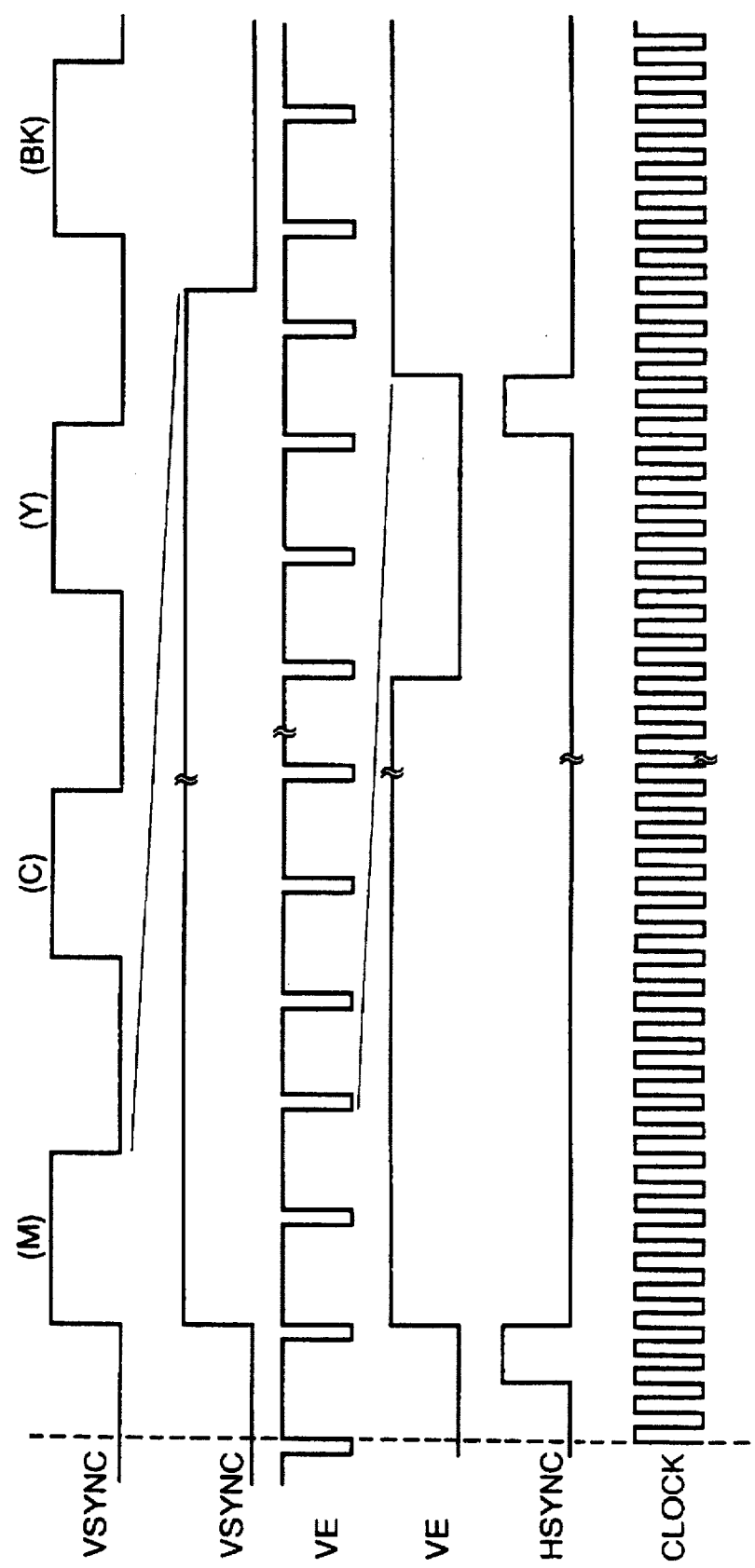
FIG. 16 is a timing chart of image control signals.

FIG. 16 shows the timings of all control signals.

The VSYNC signal is an image valid interval signal in the subscanning direction. When the VSYNC signal is set at "1", an image is read (scanned) to sequentially form output signals of (M), (C), (Y), and (BK). The VE signal is the pixel valid interval signal in the main scanning direction. When the VE signal is set at "1", the timing of the main scanning start position is set. A CLOCK signal is a pixel sync signal. When the CLOCK signal Goes to level "1", image data is transferred.

An image pattern (identification mark) to be detected according to the present invention will be Generally described with reference to FIG. 3.

Figure 3:
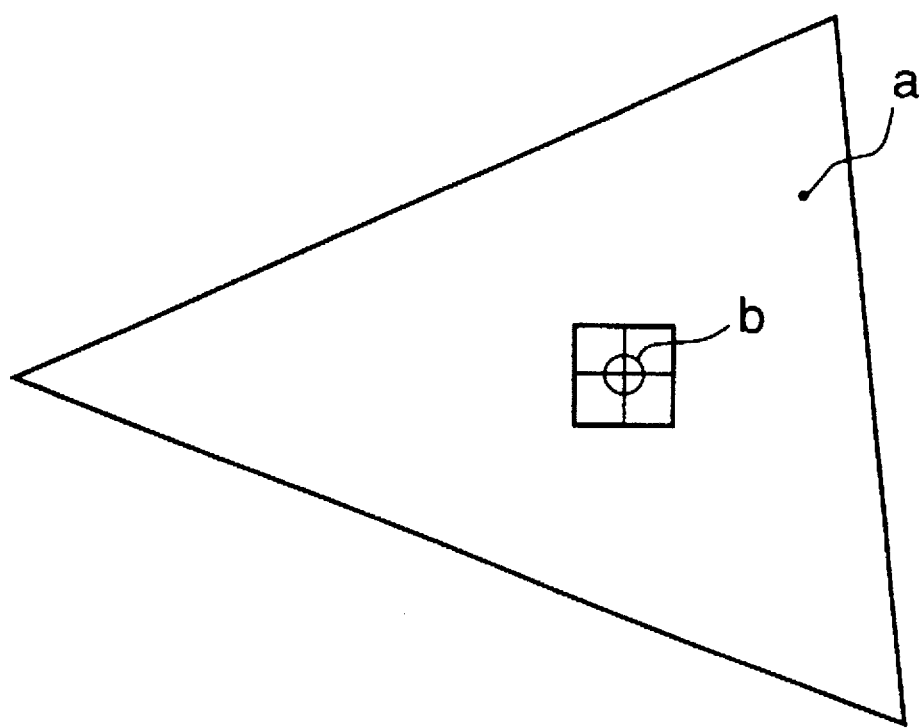
FIG. 3 is a view showing a specific original identification pattern in the first embodiment.

FIG. 3 shows a pattern formed using a transparent ink consisting of a transparent infrared absorption dye having the characteristics shown in FIG. 9. That is, a small square pattern b having one side of 120 µm is printed with the transparent ink on a triangular pattern recorded with an ink a which does not absorb a specific infrared ray.

Figure 4:
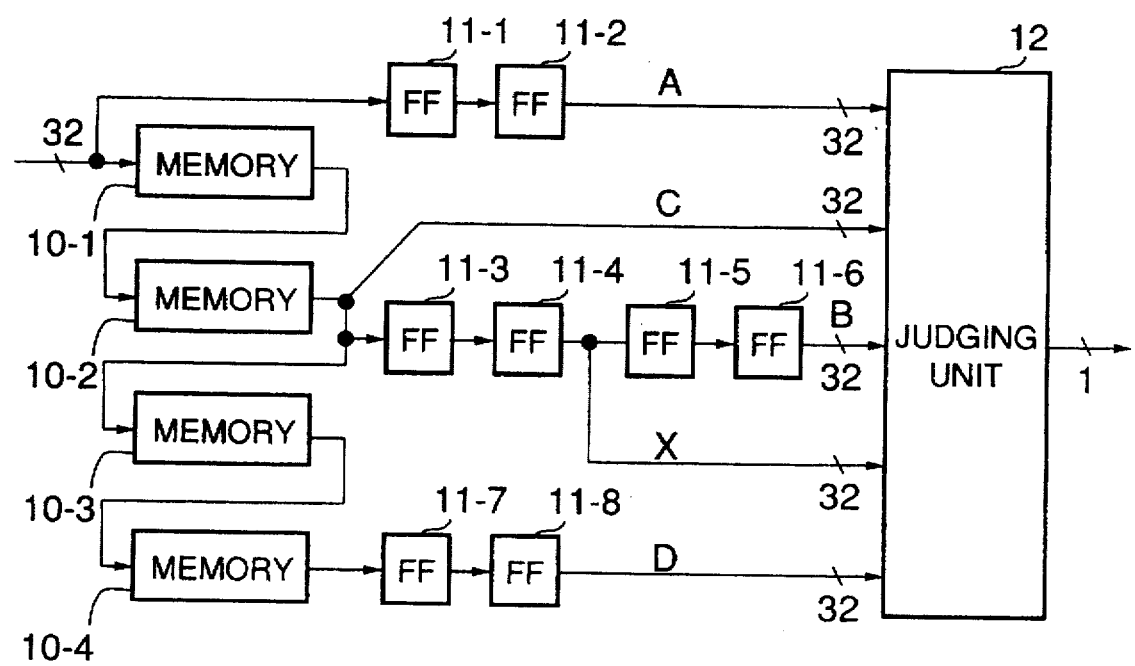
FIG. 4 is a block diagram of a two-dimensional area signal generation unit for detecting a specific pattern in the first embodiment.

The pattern b is rarely noticeable in the visible range and cannot be identified with the human eye. However, this pattern b can be detected in the infrared range. The square pattern having one side of 120 µm is exemplified for the subsequent descriptive convenience. When the area of the pattern b is read at a resolution of 400 dpi (dots per inch), the area is detected as a size of about four pixels, as indicated in FIG. 4.

A method of forming this pattern is not limited to the illustrated one. Better judgment can be performed if a circular or concentric pattern independent of an original direction is formed.

The details of the identifying unit 3 in FIG. 15 will be described with reference to FIG. 4. Image data line delay units or line memories 10-1 to 10-4 comprise FIFOs. The address pointers of the line memories 10-1 to 10-4 are initialized by the line sync signal HSYNC. Data write access and data read access to the line memories 10-1 to 10-4 are performed in response to the CLOCK signal in units of pixels. The line memories 10-1 to 10-4 delay 32-bit R, G, B, and IR data by one line each.

An input signal is delayed by flip-flops 11-1 and 11-2 by two pixels to generate pixel data A. The input signal is delayed by the line memories 10-1 and 10-2 by two lines to generate pixel data C. The pixel data C is then delayed by two pixels and four pixels to generate target pixel data X and pixel data B, respectively. Similarly, the pixel data D is input to a judging unit 12.

Figure 5:
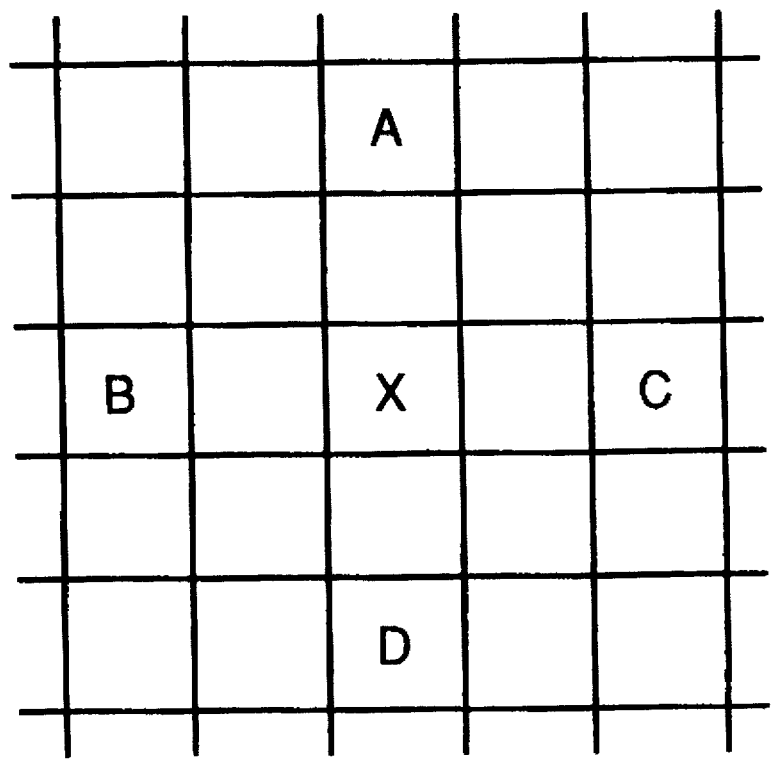
FIG. 5 is a view showing reference pixels for detecting the specific pattern in the first embodiment.

The positional relationship between the four pixels of the pixel data A, B, C, and D near the position of the target pixel is shown in FIG. 5.

More specifically, if the target pixel X includes the pattern b in FIG. 3, the pixels A, B, C, and D include the pattern a surrounding the pattern b.

A judging algorithm of the judging unit 12 used in this embodiment will be described below.

R, G, B, and IR components of the read signal constituting the pixel signal A are defined as $A_R$, $A_G$, $A_B$, $A_{IR}$, and the components of the pixel signals B, C, and D are defined in the same manner as described above. Average values $Y_R$, $Y_G$, $Y_B$, and $Y_{IR}$ of the read signals of the R, G, B, and IR components of the respective pixel signals are expressed as follows:

$$Y_R = \frac{1}{4}(A_R + B_R + C_R + D_R)$$

$$Y_G = \frac{1}{4}(A_G + B_G + C_G + D_G)$$

$$Y_B = \frac{1}{4}(A_B + B_B + C_B + D_B)$$

$$Y_{IR} = \frac{1}{4}(A_{IR} + B_{IR} + C_{IR} + D_{IR})$$

Judgment of the target pattern is performed in accordance with differences between the average values Y and the target pixel X.

More specifically, a pattern is detected when the following equations are established:

$$\Delta R = |Y_R - X_R|$$
$$\Delta G = |Y_G - X_G|$$
$$\Delta B = |Y_B - X_B|$$
$$\Delta IR = |Y_{IR} - X_{IR}|$$

where $X_R$, $X_G$, $X_B$, and $X_{IR}$ are the R, G, B, and IR components of the target pixel X.

A specific pattern is detected under the following conditions:

$$\Delta R < K$$
$$\Delta G < K$$
$$\Delta B < K \text{ and}$$
$$(\Delta IR > L1 \text{ or } Y_{IR}/X_{IR} > L2)$$
$$(K, L1, \text{ and } L2 \text{ are constants})$$

that is, the target pixel X is compared with the neighboring pixels A, B, C, and D. If a color tone different is small (K is small) and a difference of the constant L1 or more is present in the infrared range, or if a ratio of the neighboring level to the level of the target pixel X in the infrared region is the constant L2 or more, the specific pattern is detected.

Judgment of the infrared region is performed on the basis of not only the difference but also the ratio because a decrease in level of the infrared signal due to contamination is taken into consideration. The influence of contamination which attenuates the infrared read signal as a whole is eliminated by detecting the ratio.

Figure 6:
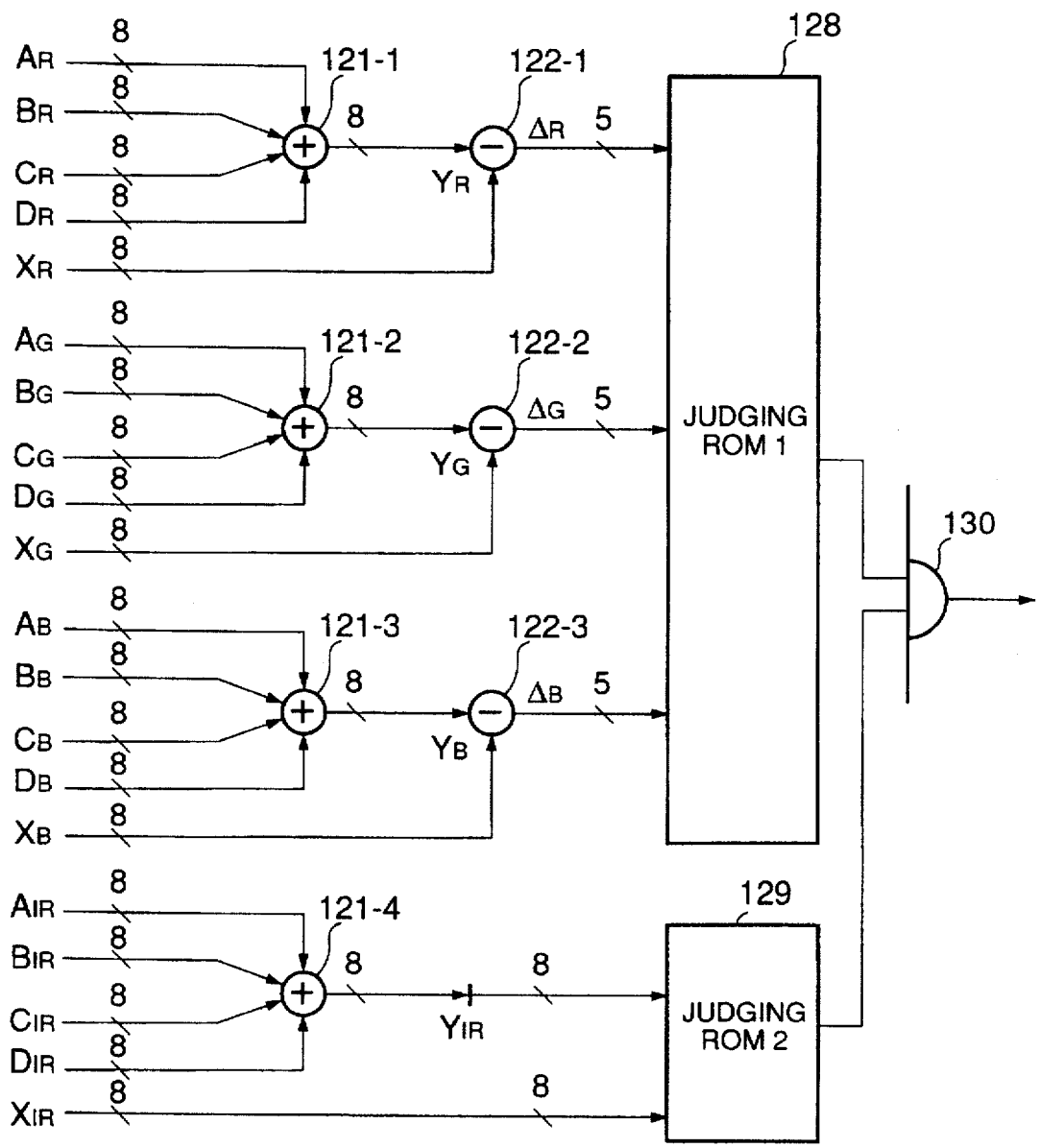
FIG. 6 is a diagram of a specific pattern judging unit of the first embodiment.

An arrangement of the judging unit 12 which practices the above algorithm is shown in FIG. 6.

Each adder 121 simply adds the 4-pixel color components, and outputs upper eight bits, so that the adders 121-1 to 121-4 output YR, YG, YB, and YIR. Each subtracter 122 obtains a difference between the target pixel signal and a corresponding color component and supplies upper five bits of each of the $\Delta R$, $\Delta G$, and $\Delta B$ components to a judging LUT (judging ROM 1) 128. When each 5-bit signal is smaller than the constant K, the judging ROM 128 outputs a signal of level "1".

Similarly, as for the infrared read signal, 8-bit YIR and XIR are input to the address terminals of a judging LUT (judging ROM 2) 129 constituted by a ROM. If condition $\Delta IR > L1$ or $Y_{IR}/X_{IR} > L2$ is established in the calculation $\Delta IR = Y_{IR} - X_{IR}$, the judging ROM 129 outputs a signal of level "1".

The outputs from the judging ROMs 128 and 129 are logically ANDed by an AND gate 130. When the AND gate 130 outputs a signal, the specific pattern is detected.

The judging result is input to a latch 3022 in FIG. 15. A latch output is input to an input port P10 of the CPU 3018, and the CPU detects that the specific mark has been detected. Prior to the start of the copy sequence, the CPU 3018 clears the latch 3022 in response to a signal from an output port P9 and prepares for detection of the next pattern.

Figure 17:
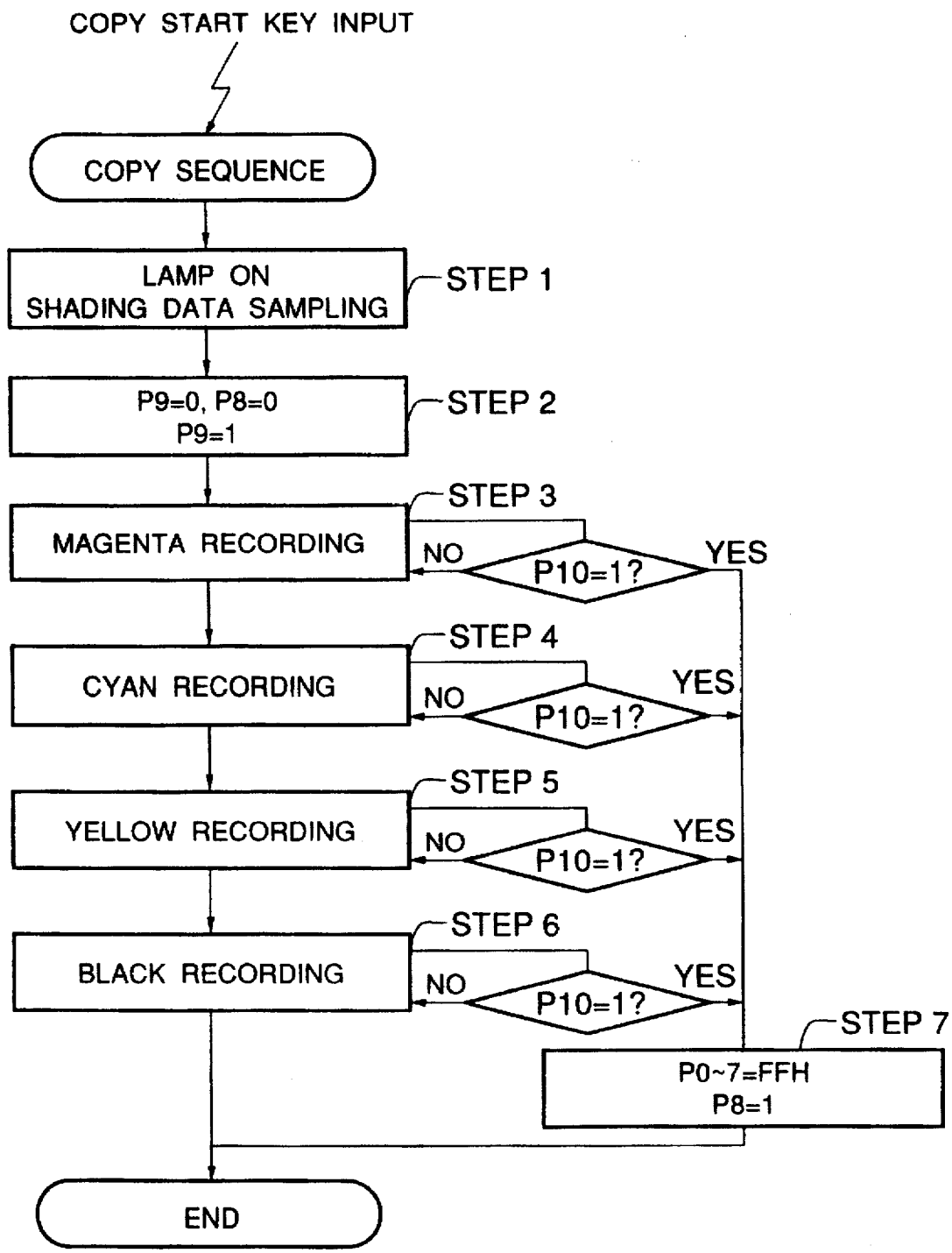
FIG. 17 is a flow chart showing CPU control.

The control operation of the CPU in judging an identification mark during a normal copy operation will be described with reference to FIG. 17.

When the operator places the original 204 on the platen 203 and starts the copy operation at an operation unit (not shown), the CPU 3018 controls a motor (not shown) and moves the reflecting mirror 206 to a position below the standard white board 211.

The halogen lamp 205 is turned on to illuminate the standard white board 211. IR, R, G, and B signal shading data are sampled in the shading correction units 3006 to 3009 (step 1).

The port output P9 goes to level "0" to clear the output from the latch 3022 to zero. An output at an output port P8 is cleared to zero. An A input to the selector 3017 is selected to supply a masked/UCR-processed image signal to the printer unit. The output from the output port P9 goes to level "1" to complete the clearing operation of the latch 3022 (step 2).

Four original read cycles are performed in synchronism with the image recording operations of the four colors, i.e., M, C, Y, and BK in the printer unit, to perform image recording. At the same time, an identification mark is detected, and the recording operation is controlled in accordance with this detection result.

The CPU sets magenta process condition in the masking/UCR processing Unit for magenta recording, and the optical system is scanned to supply a magenta signal to the printer unit. Upon completion of scanning, the optical system is returned to the scanning start position (step 3).

The CPU fetches an input to the port P10 during original reading to judge whether the input to the port P10 is "1". If so, the CPU judges that a specific original supposed to inhibit normal copying is being copied. An output from ports P0 to P7 is set to "FF"H and an output from the port P8 is set at "1". The CPU outputs a solid black signal of "FF"H to the printer unit, thereby inhibiting the subsequent normal copy operation.

Recording control of cyan, yellow, and black is performed in steps 4 to 6 in the same manner as described above, and the CPU periodically checks the state of the port P10. If the output at the port P10 is set at level "1", the solid black signal of "FF"H is output to the printer unit in step 7.

If P10=1 is detected during cyan recording, the magenta component can be normally copied, but recording with cyan, yellow, and black is performed with the solid black signal of "FF"H.

<Second Embodiment>

Figure 18A:
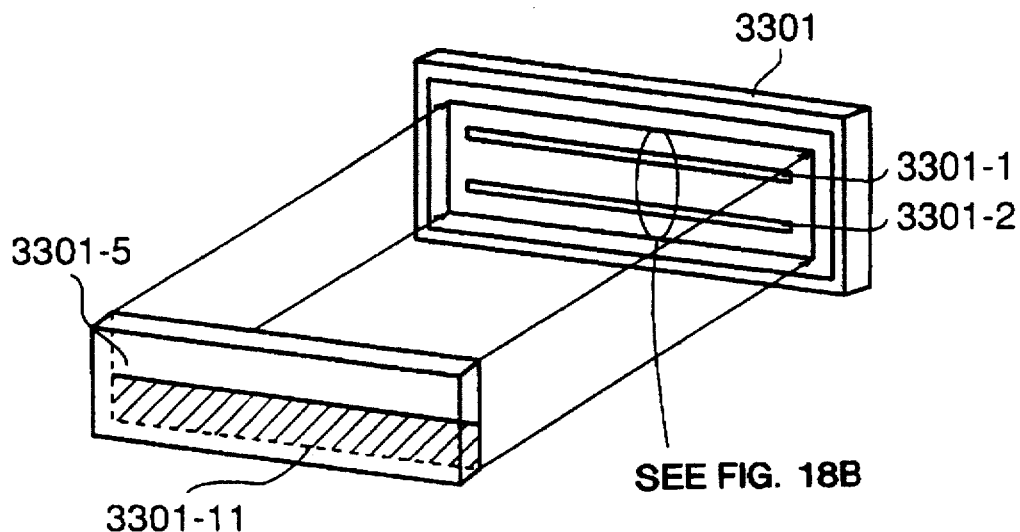
FIGS. 18A and 18B are views showing the structure of an image reading apparatus according to the second embodiment.
Figure 18B:
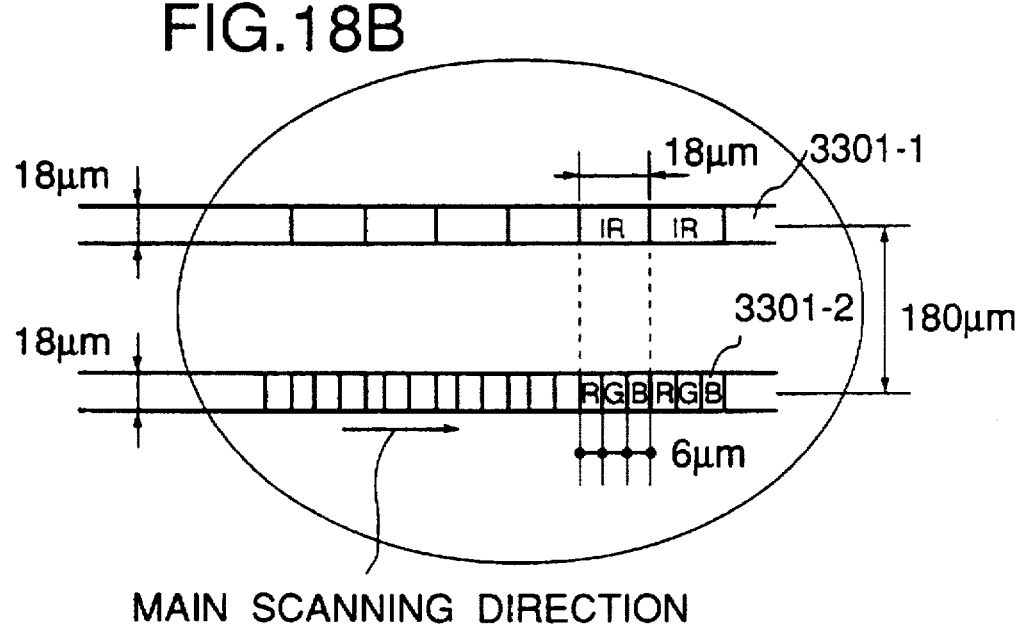

An image reading apparatus according to the second embodiment of the present invention is shown in FIGS. 18A and 18B.

As shown in FIG. 18A, two line sensors are monolithically formed on a common silicon chip to constitute a CCD.

A line sensor 3301-1 is an infrared read sensor (IR sensor), and a full-color line sensor 3301-2 is formed by alternately forming R, G, and B sensors in units of pixels.

A glass plate 3301-5 on which an infrared cut dichroic filter 3301-11 is deposited is mounted on the sensor in the same manner as in FIGS. 7A and 7B.

The dichroic filter (dichroic mirror) 3301-11 has the same infrared cut characteristics (FIG. 11) as those of the filter 210-11.

The glass plate is mounted on the CCD chip such that the deposition surface faces the chip surface in the same manner as in FIGS. 7A and 7B. The end portion of the deposition portion is located between the line sensors 3301-1 and 3301-2.

FIG. 18B is an enlarged view of pixels of the line sensors 3301-1 and 3301-2.

The IR sensor 3301-1 has a square pixel size having a side of 18 µm. The R and B filters having the characteristic curve in FIG. 10 are stacked on the sensor to provide the same infrared transmission characteristics as these of the IR sensor 210-1.

When this IR sensor is combined with a far-infrared cut filter having the characteristics (FIG. 12) arranged in an imaging optical system (not shown) as in the first embodiment, the same infrared read characteristics as in the first embodiment can be provided.

The RGB sensor array 3301-2 is spaced apart from the IR sensor 3301-1 by 180 µm (10 lines), and R, G, and B pixels each having a size of 6 µm are formed in correspondence with the size (18 µm) of one pixel of the IR sensor in the main scanning direction. Color separation filters having the characteristics shown in FIG. 10 are formed on the R, G, and B pixels.

This sensor has 5,000 main scanning pixels to read an A3-size original at a resolution of 400 dpi and has 5,000 combinations of R, G, and B components.

The reduction ratio of the optical system is 18/63.5 so as to project 63.5 µm (one pixel of 400 dpi) of the original table into 18 µm.

<Third Embodiment>

Figure 19A:
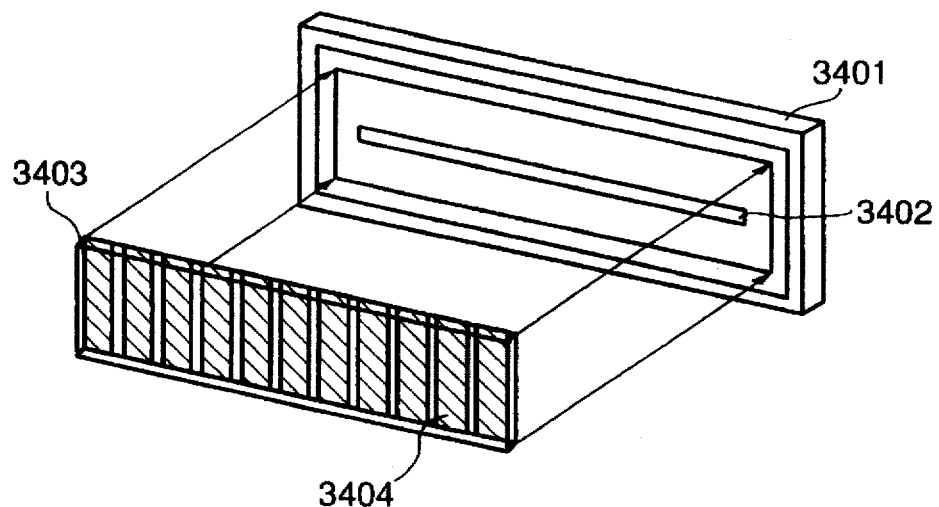
FIGS. 19A and 19B are views showing the structure of an image reading apparatus according to the third embodiment.
Figure 19B:
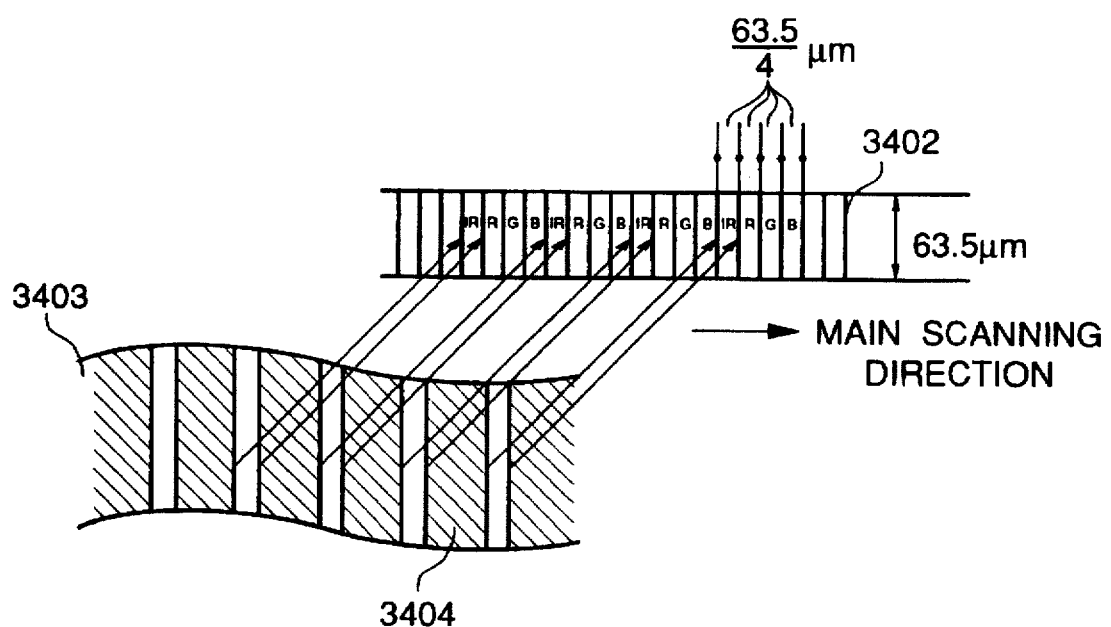

An image reading apparatus according to the third embodiment of the present invention is shown in FIGS. 19A and 19B.

As shown in FIG. 19A, a cod 3401 has a sensor 3402 on which R, G, B, and IR sensors are arranged on one line. Image data of one pixel is color-separated (wavelength separation) and read by a combination of IR, R, G, and B.

The pixel size of the set of IR, R, G, and B pixels in the main scanning direction is 63.5/4 µm, and one pixel of 63.5 µm is read by the combination of the IR, R, G, and B.

The reduction ratio of the optical system is a one-to-one size so that 63.5 μm (one pixel of 400 dpi) of the original table) is projected into 63.5 μm.

R and B filters having the characteristics shown in FIG. 10 are stacked on an IR read sensor portion, and this sensor portion has the same infrared transmission characteristics as those of the IR sensor 210-1.

When this IR sensor portion is combined with a far-infrared cut filter having the characteristics (FIG. 12) and arranged in an imaging optical system (not shown), the same infrared read characteristics as in the first embodiment can be provided. Color separation filters having the characteristics shown in FIG. 10 are provided to the R, G, and B read pixels.

An infrared cut dichroic filter 3404 having a pitch of 63.5×¾ μm is formed on the sensor, and a glass plate 3403 having a width of 63.5/4 μm is mounted on the IR sensor portion, as shown in FIG. 19A.

The dichroic filter 3404 has the same infrared cut characteristics shown, in FIG. 11 as in the filter 210-11.

The glass plate is mounted on the CCD chip such that the deposition surface faces the chip surface as in FIGS. 7A and 7B, and a non-deposition portion corresponds to the IR pixel portion, as shown in FIGS. 19A and 19B.

Except for the above arrangement, i.e., an arrangement in which a sensor as a combination of IR, R, G, and B for reading one pixel is arranged in the main scanning direction, four pixels may be two-dimensionally arranged, and an infrared dichroic filter may cover only a portion corresponding to the R, G, and B pixels of the glass plate.

In the above embodiments, an infrared cut filter is constituted by a transparent member and mounted on the sensor. However, the characteristics of this sensor are not limited to the ones described above. A sensor may cut ultraviolet components unnecessary for reading visible light information.

According to the first to third embodiments, a member having characteristics for shielding light except for visible light is partially arranged near the light-receiving surfaces of the visible light sensor and a sensor for reading light except for the visible light, and the light-shielding portion of the member which shields the light except for the visible light is arranged to correspond to the visible light read sensor. The light except for the visible light can be properly cut with respect to the visible light sensor, and color precision of the read signals from the visible light sensor and the sensor for reading the light except for the visible light, which sensors are formed monolithically, can be improved.

<Fourth Embodiment>

Figure 24:
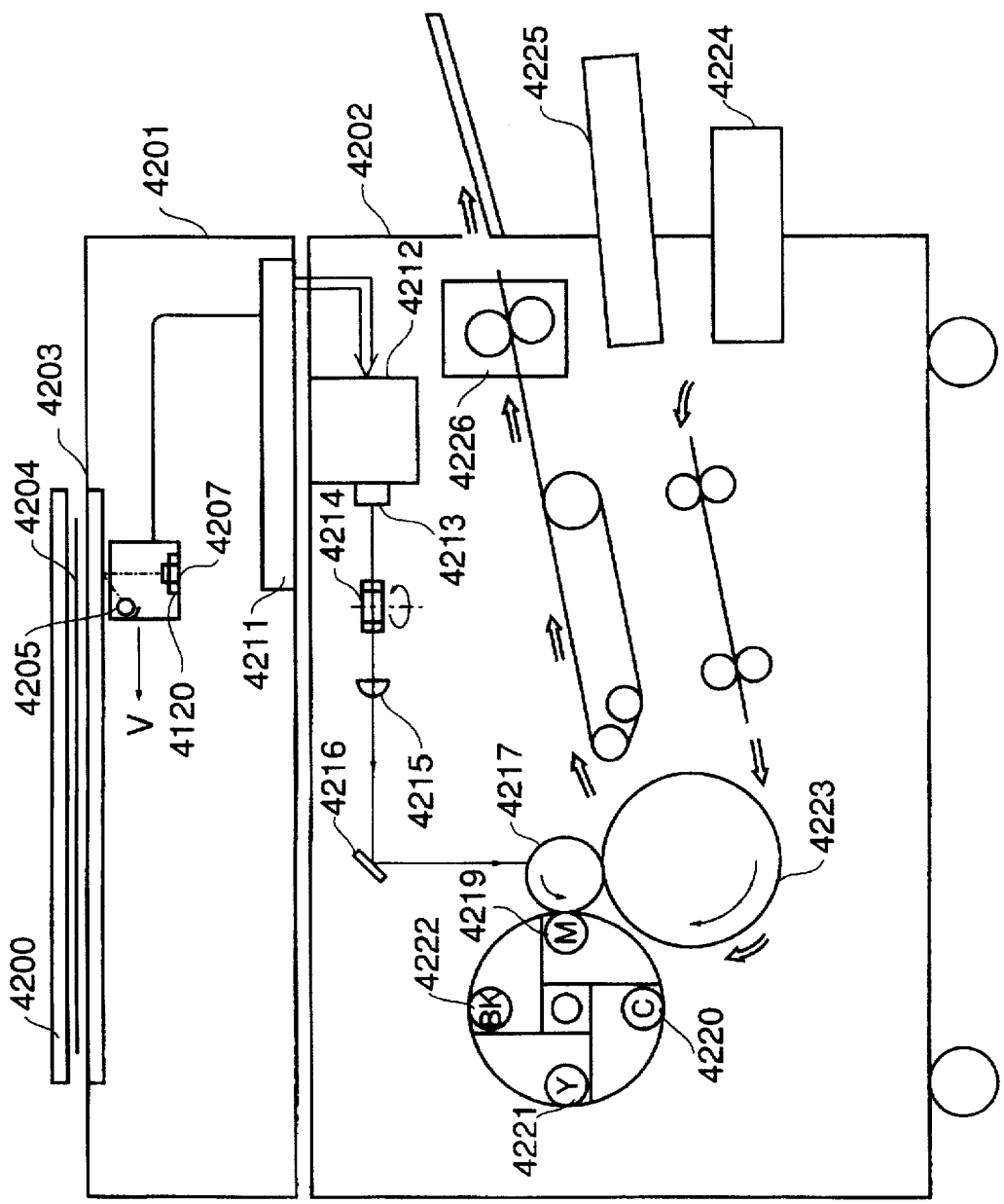
FIG. 24 is a view showing a copying machine to which the present invention is applied.

FIG. 24 shows the outer appearance of an apparatus according to the fourth to eighth embodiments (i.e., an arrangement of an image scanner unit).

Referring to FIG. 24, an image scanner unit 4201 reads an original and performs digital signal processing. A printer unit 4202 prints and outputs, on a paper sheet, a full-color image corresponding to the original image read by the image scanner unit 4201.

The image scanner unit 4201 includes a mirror surface press plate 4200. An original 4204 on an original table glass (to be referred to as a platen hereinafter) 4203 is illuminated with light from a halogen lamp 4205. Light reflected by the original is focused on a color sensor (a CCD line sensor is used in this embodiment) 4210, and full-color information as red (R), green (G), and blue (B) components and an infrared component (IR) are sent to a signal processing unit 4211. A reading unit 4207 is mechanically moved in a direction (subscanning direction) perpendicular to an electrical scanning direction (to be referred to as a main scanning direction hereinafter) of the color sensor at a speed v, thereby scanning the entire surface of the original.

The signal processing unit 4211 electrically processes the read signal and color-separates the read signal into magenta (M), cyan (C), yellow (Y), and black (BK) components. The signal processing unit 4211 surface-sequentially sends these component signals to the printer unit 4202.

(Arrangement of Printer unit 4202)

The M, C, Y, and BK image signals sent from the image scanner unit 4201 are sent to a laser driver 4212. The laser driver 4212 modulates and drives a semiconductor laser 4213 in accordance with the input image signals. A laser beam scans the surface of a photosensitive drum 4217 through a polygon mirror 4214, an f-Θ lens 4215, and a mirror 4216.

A rotary developing assembly 4218 comprises a magenta developing unit 4219, a cyan developing unit 4220, a yellow developing unit 4221, and a black developing unit 4222. These four developing units are sequentially brought into contact with the photosensitive drum to develop the M, C, Y, and BK latent images on the photosensitive drum 4217 with the corresponding toners.

A transfer drum 4223 winds a paper sheet fed from a paper cassette 4224 or 4225 thereon and transfers the toner images from the photosensitive drum 4217 to the paper sheet.

As described above, the M, C, Y, and BK images are sequentially transferred to the paper sheet, and the sheet is then fixed by a fixing unit 4226. The fixed sheet is finally discharged outside the apparatus.

The scanner unit and printer unit of the apparatus have been roughly described above.

The details of the image scanner unit 4201 will be described below.

As a method of detecting a banknote or the like, a technique for recognizing a pattern printed with a fluorescent ink on the banknote or the like is proposed. The fluorescent spectrum distribution of such an ink falls in the invisible light range, i.e., the infrared or ultraviolet range. For this reason, to read information in the invisible light range, a reading unit having a reading system having an optical path in which a filter for transmitting only an infrared or ultraviolet ray may be proposed.

Figure 20:
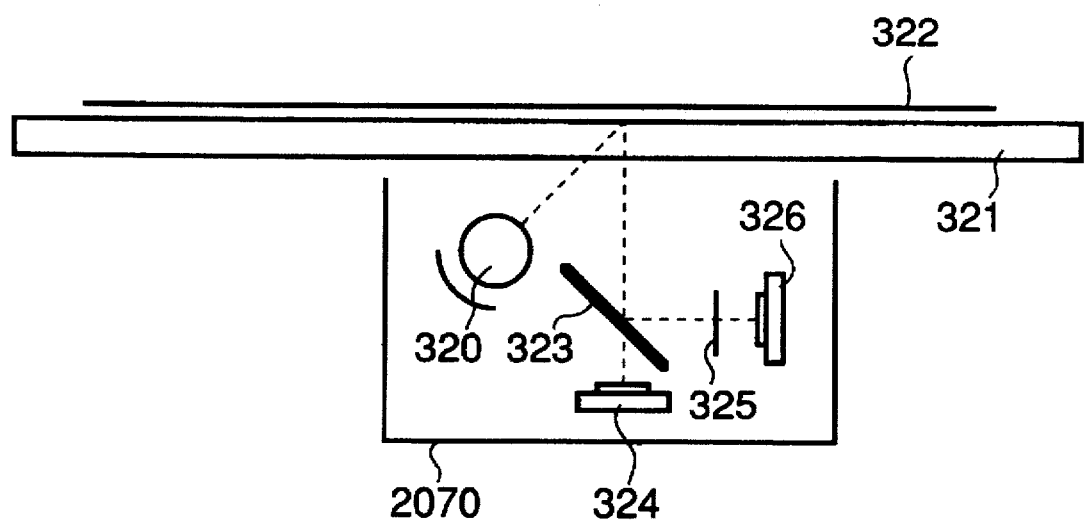
FIG. 20 is a view showing a conventional reading system 2070.

For example, when an image of an original 322 placed on an original table 321 is to be read with light from an illumination light source 320, as shown in FIG. 20, image information passing through a half mirror 323 is read by a color sensor 324. On the other hand, image information reflected by the half mirror 323 is read by a monochrome sensor 326 through a filter 325 for transmitting a desired spectral region corresponding to the infrared or ultraviolet rays. By using this reading system 2070, color image information of the original 322 can be read by the color sensor 324. Invisible light information printed in the original 322 can be read by the monochrome sensor 326. With this arrangement, while a general color read operation of the original is performed, a banknote or the like printed with invisible light information can also be read and judged, thereby preventing counterfeit banknotes.

Figure 21A:
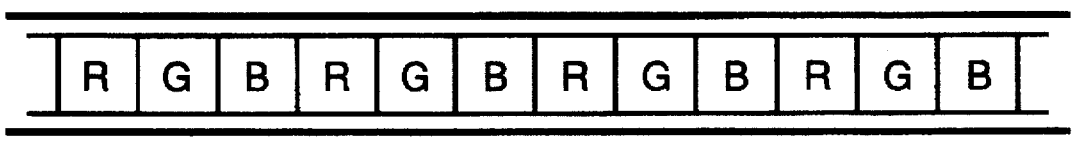
FIGS. 21A and 21B are views showing arrangements of conventional color sensors.
Figure 21B:

The reading system having the arrangement in FIG. 20 must have two sensor systems and two reading systems to result in high cost and a complicated arrangement. In order to eliminate this drawback, pixels having filters having characteristics of the filter 325 shown in FIG. 20 are provided in addition to pixels for color-separating the R (red), G (green), and B (blue) components in the color sensor. The structure of such a color sensor will be described with reference to FIGS. 21A and 21B. FIG. 21A shows the structure of a general color sensor, and FIG. 21B shows the structure of a color sensor in which pixels for reading invisible light information are arranged. In the general color sensor, R, G, and B filters are sequentially deposited in an order of R, G, B, R, G, B . . . , as shown in FIG. 21A. A set of R, G and B pixels constitute a minimum unit picture element to color-separate image information focused on the color sensor, thereby reading the color image.

On the other hand, the color sensor (FIG. 21B) having the pixels for reading invisible light information has filters deposited in an order of R, G, B, IR, R, G, B, IR, . . . when the invisible light information is an infrared ray (IR is an infrared filter). R, G, B, and IR constitute a minimum unit picture element to color-separate image information and at the same time read components in the infrared region. However, the color sensor having the structure shown in FIG. 21B has narrower dynamic range of output signals of the pixels than that of the color sensor having the structure shown in FIG. 21A.

Figure 22A:
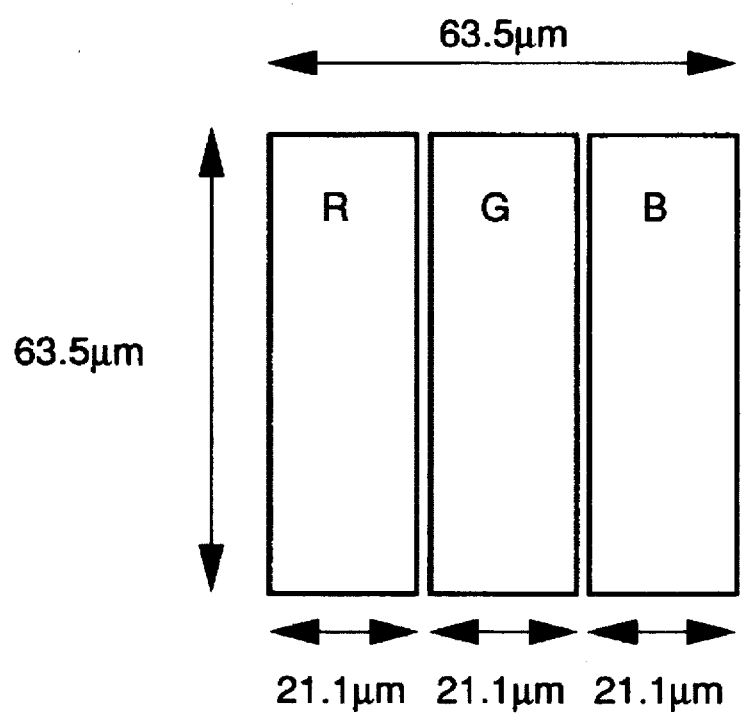
FIGS. 22A and 22B are views showing the pixel sizes of the conventional color sensors.
Figure 22B:
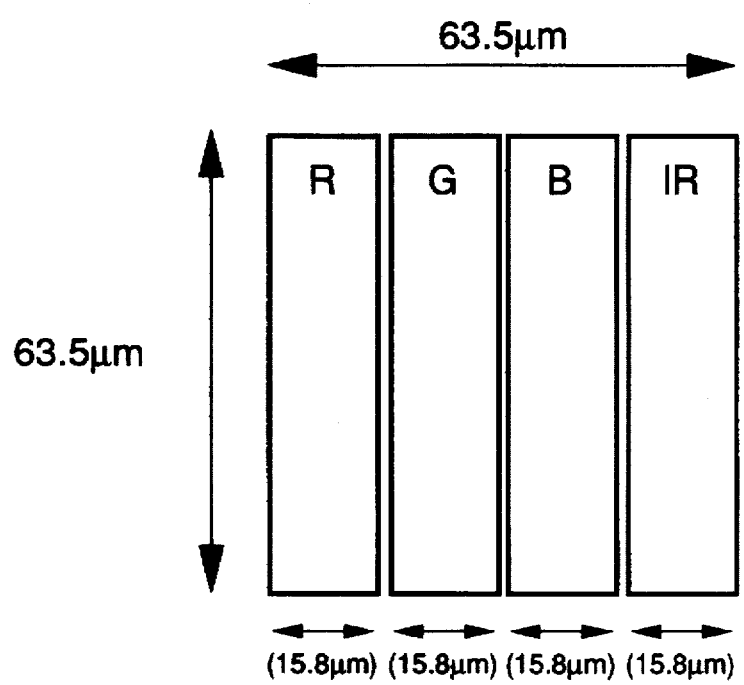

This drawback will be described with reference to FIGS. 22A and 22B. FIG. 22A is a view showing one picture element of the general color sensor. If the resolution of the read portion is 400 dpi (dots per inch), the read area of one picture element is 63.5 µm (=25.4 mm/400). That is, the read area of one RGB pixel is 21.1 µm×63.5 µm. To the contrary, FIG. 22B shows one picture element of the color sensor having the structure shown in FIG. 21B. To realize a resolution of 400 dpi, the area of one pixel becomes 15.8 µm×63.5 µm, and the light amount received by the pixel is reduced to 75% that of the conventional case. For this reason, the dynamic range of the signal output from each pixel is greatly narrowed. In particular, a pixel IR for reading components in the infrared region cuts off almost all the visible light components, and almost no signal may be obtained depending on the spectrum distribution of an illumination light source. To solve this problem, a pixel array for reading invisible light information is arranged in the color sensor independently of the conventional color separation pixel array to detect a specific pattern printed on a banknote or the like with an almost transparent infrared fluorescent ink. The pieces of information of the respective pixel arrays may be compared with each other to detect the presence/absence of the infrared fluorescent ink pattern.

With the above arrangement, even if positional correction is performed using a line buffer for correcting an interval between the pixel arrays, correction of one pixel or less cannot be performed because the minimum correction unit is one pixel. As a result, accurate positional correction cannot be performed.

A distance between the two pixel arrays is determined to be an integer multiple of the pixel pitch of the sensor to solve the above problem.

In the two-array arrangement described above, the line buffer for correcting the distance between the pixel arrays is expensive to result in high cost as a whole.

The read operations are performed in an order of the color separation pixel array and the invisible light information read pixel array in the order named. The distance between the two pixel arrays is corrected by a line delay generated in processing the color separation pixel array, thereby solving the problem described above.

The above arrangement will be described in detail with reference to the accompanying drawings.

Figure 23:
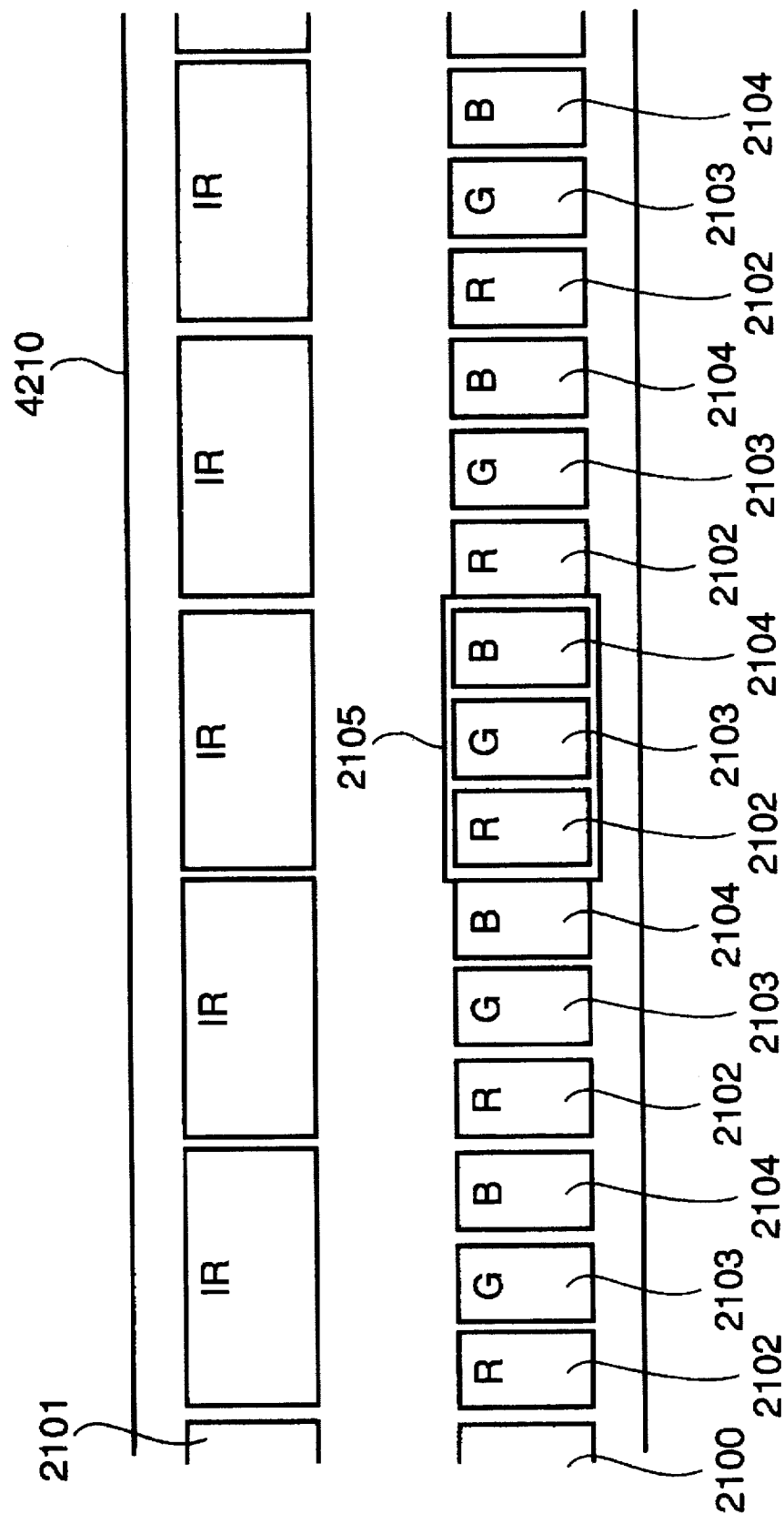
FIG. 23 is a view showing the structure of color sensors according to the fourth and fifth embodiments.
Figure 25:
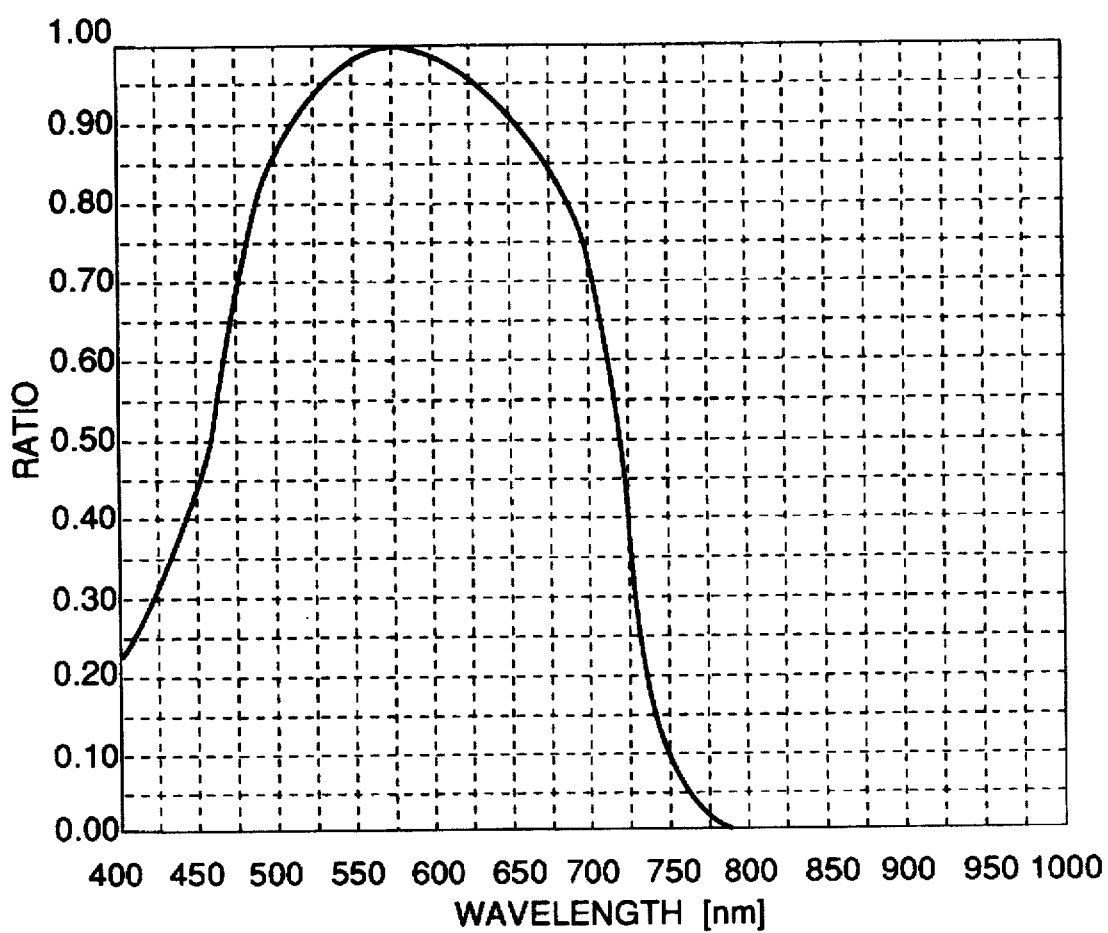
FIG. 25 is a graph showing emission distribution characteristics of a halogen lamp.
Figure 26:
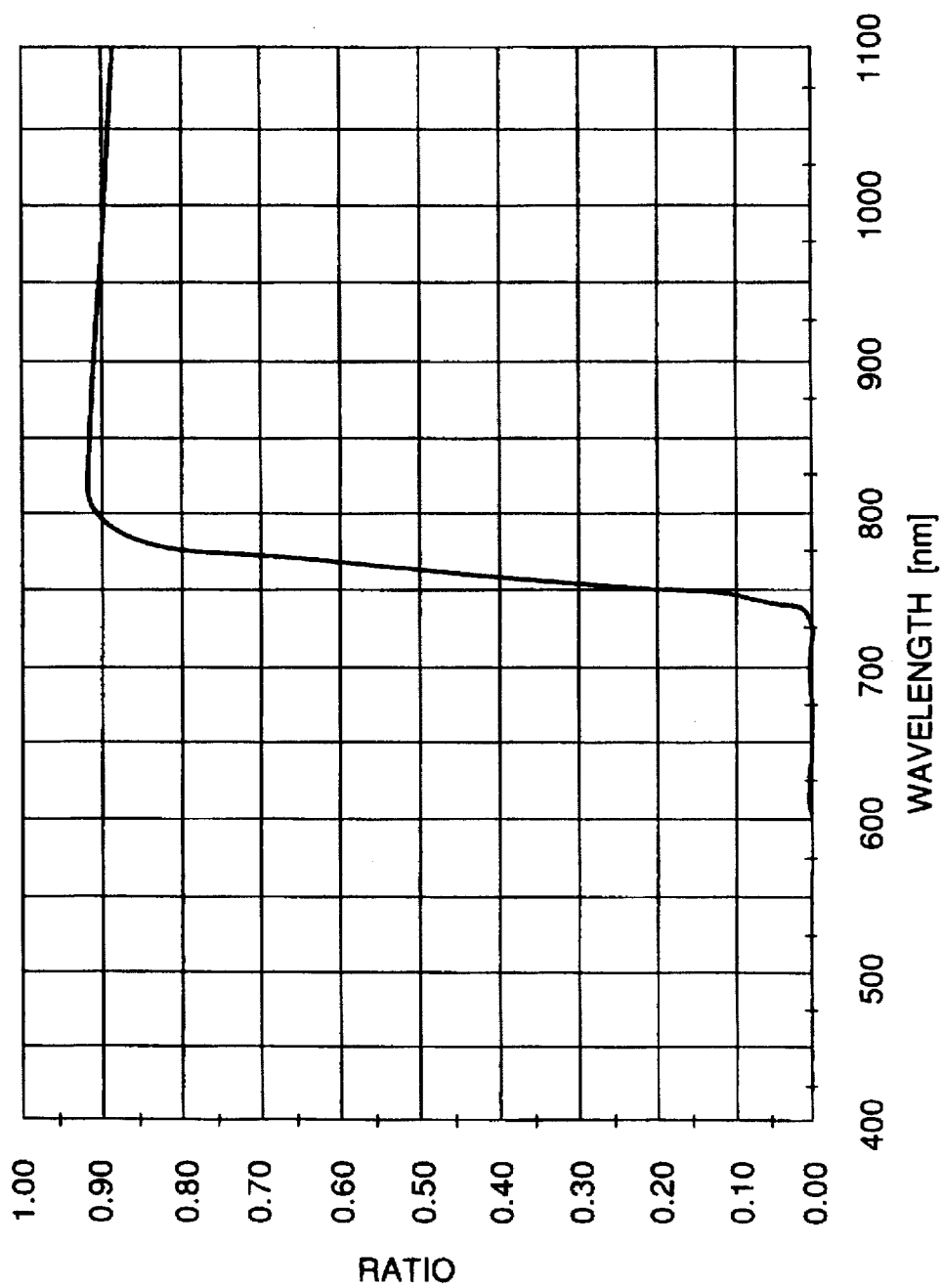
FIG. 26 is a graph showing the characteristics of a visible light cut filter.
Figure 27:
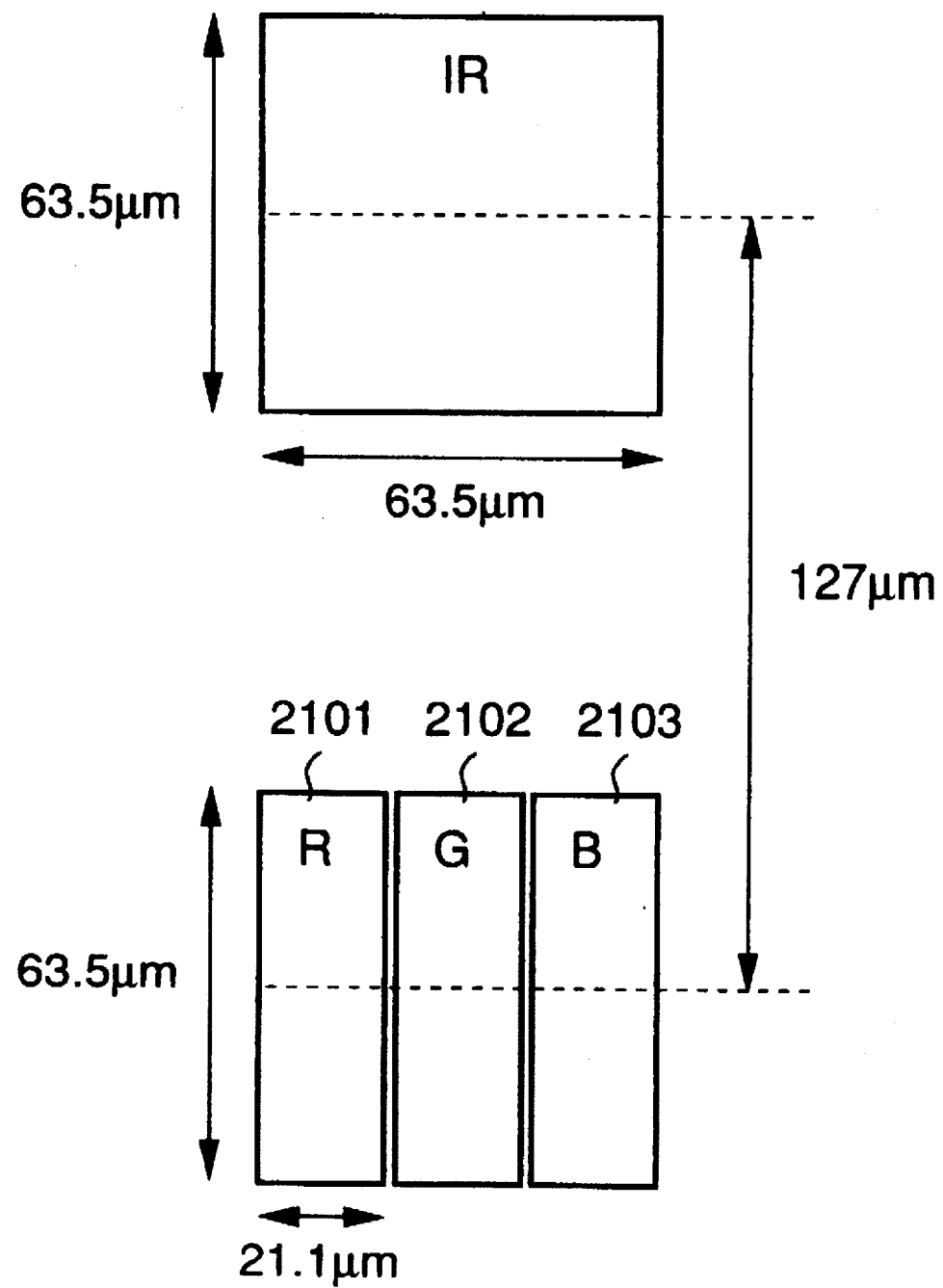
FIG. 27 is a view showing the pixel sizes of color sensors to which the present invention is applied.
Figure 37:
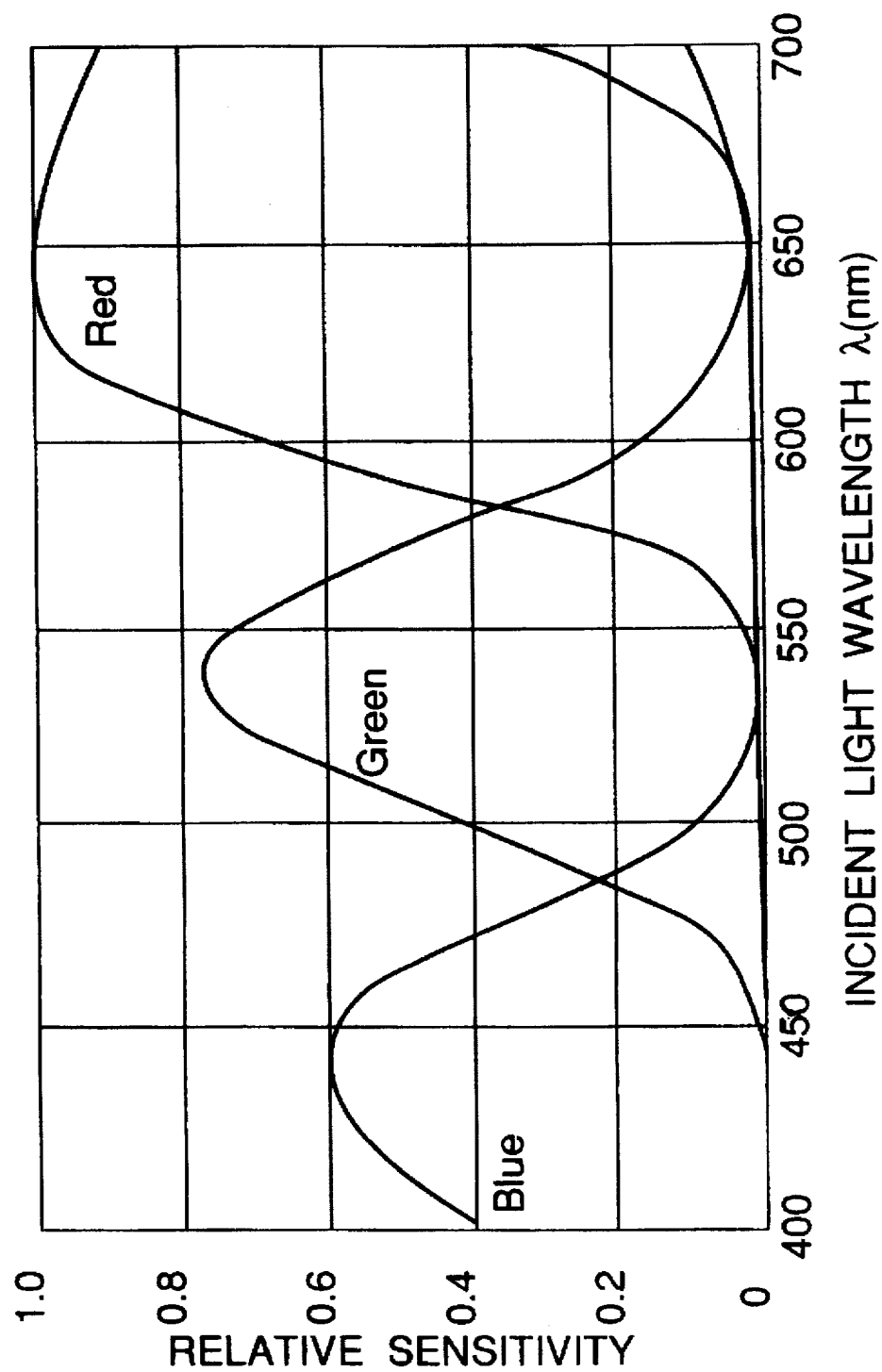
FIG. 37 is a graph showing the spectral characteristics of R, G, and B filters.

The structure of the color sensor 4210 of this embodiment is shown in FIG. 23. The color sensor 4210 is constituted by a first pixel array 2100 and a second pixel array 2101. The first pixel array is formed such that R, G, and B filters 2102, 2103, and 2104 are sequentially deposited in an order of R, G, B, R, G, B . . . , and three pixels, i.e., R, G, and B constituting one picture element 2105 serve as a minimum read area, thereby constituting a reading system. The spectral characteristics of filters deposited in units of pixels are shown in FIG. 37, and the emission distribution characteristics are shown in FIG. 25. Referring to FIG. 37, relative sensitivities at wavelengths of 700 nm or more are not shown in FIG. 37. The filters have infrared cut filter characteristics for cutting the components having wavelengths of about 700 nm or more shown in FIG. 11, so that the relative sensitivities at the wavelengths of 700 nm or more can be considered to be almost zero. On the other hand, the second pixel array 2101 is arranged such that pixels are aligned at a pitch three times that of the first pixel array 2100. That is, the pixels of the second pixel array are arranged at the same pitch as that of the picture element pitch of the first pixel array 2100. A visible light cut filter having the characteristics shown in FIG. 26 is deposited on the second pixel array 2101. The components having the wavelengths of 700 nm or less are cut in the pixel array 2101, thereby reading the infrared components. The sizes of the pixels of the first and second pixel arrays 2100 and 2101 and their positional relationship are shown in FIG. 27. In this case, the reading unit has a resolution of 400 dpi (dots per inch), and a one-to-one size optical system is used for descriptive convenience.

To realize a resolution of 400 dpi, the minimum read area is 63.5 µm×63.5 µm. Each of the R pixel or filter 2102, the G pixel or filter 2103, the B pixel or filter 2104 has an area of 21.1 µm×63.5 µm, and the IR pixel has an area of 63.5 µm×63.5 µm. A distance between the first and second pixel arrays 2100 and 2101 is set to 127 µm. That is, the first pixel array 2100 is spaced apart from the second pixel array 2101 by two lines. Read signals from the first and second pixel arrays 2100 and 2101 are controlled to be sent to the signal processing unit 4211.

A pattern recognition sequence will be described below. In this embodiment, a copy-inhibited original is exemplified as an original as an object for inhibiting counterfeits. However, the present invention is not limited to this object, but can be extended to banknotes of various foreign countries and securities.

(Original)

Figure 28A:
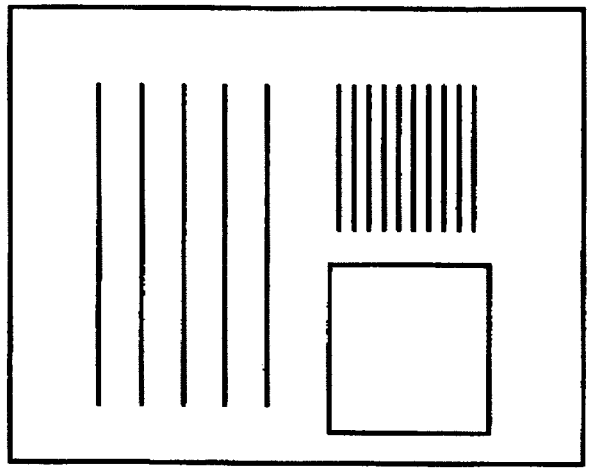
FIGS. 28A to 28C are views showing an original and original read states.
Figure 29:
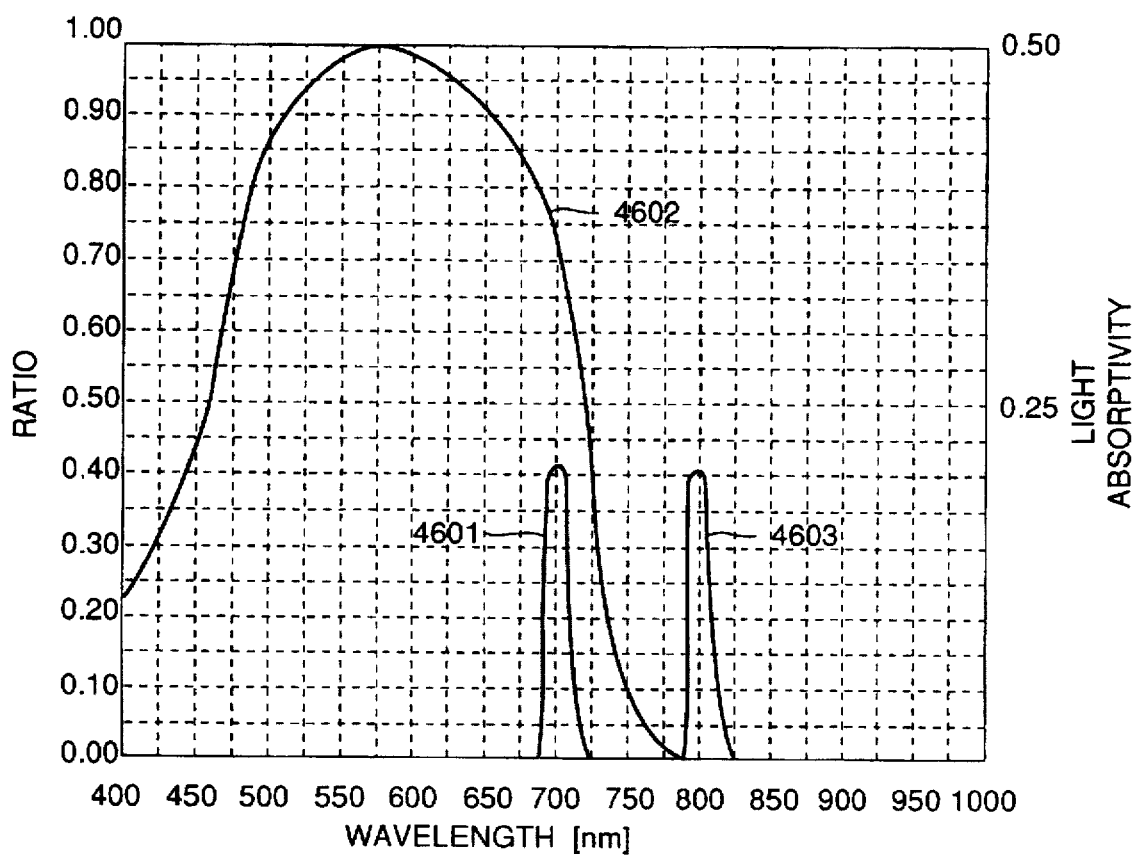
FIG. 29 is a graph showing the characteristics of a fluorescent ink.

FIG. 28A shows a copy-inhibited original (to be referred to as an original hereinafter) 4630 printed with a pattern 4631 registered in advance with an infrared ink. Characters and an image 4632 are printed with a General ink on the original 4630 in addition to the pattern 4631. The infrared ink to be printed on the original emits infrared rays having wavelengths of about 700 nm or more. The infrared rays cannot be almost recognized by the human eye having the sensitivity range of 400 to 700 nm because the infrared rays are perceived to be almost transparent. When excitation light having a given band is radiated on this infrared ink, fluorescence having a specific wavelength is generated. The emission characteristics of the fluorescent in this embodiment are shown in FIG. 29. A characteristic curve 4601 represents the absorptivity of the infrared ink as a function of the wavelength. When this fluorescent ink receives light including an infrared ray (the spectrum distribution is indicated by a characteristic curve 4602 in FIG. 29 wherein the emission intensity (ratio) is plotted along the ordinate), the fluorescent ink absorbs light having the band according to the characteristic curve 4601 and emits light whose spectrum distribution is represented by a characteristic curve 4603 (the emission intensity (ratio) is plotted along the ordinate). A fluorescent ink has a general tendency of reducing the energy of the emitted light due to energy transition in molecules of the fluorescent ink upon absorption of excitation light. The fluorescent ink emits light having a wavelength longer than that of the excitation light by the decrease in energy of the emitted light. In the case of FIG. 29, the peak wavelength of the excitation light is shifted from the peak wavelength of the fluorescence by about 100 nm. The fluorescent spectrum represented by the characteristic curve 4603 causes the pixel array 2101 in the CCD 4210 to cut the visible light components and can extract only the spectral components of the fluorescence.

(Prescan)

The image scanner unit 4201 performs prescanning as preprocessing prior to copying of the original 4630. Prescanning will be described below.

Figure 30:
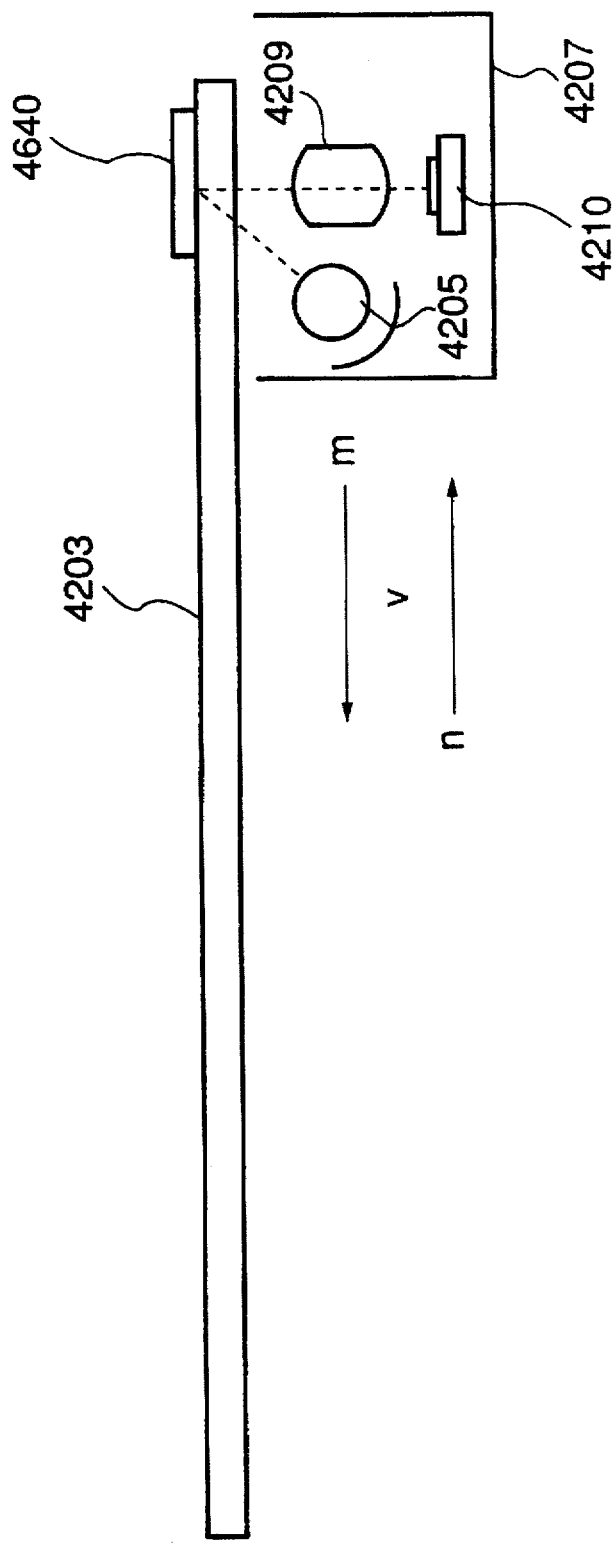
FIG. 30 is a view showing the operation of shading correction.

The lamp 4205 illuminates a white shading board 4640 attached to part of the platen 4203. A reflection image from the white shading board 4640 is formed on the CCD 4210 through the lens 4209. The image of the white shading board 4640 which is read by the pixel arrays 2100 and 2101 of the CCD 4210 is processed by the signal processing unit 4211 to generate nonuniform illumination data of the lamp 4205 and the nonuniform sensitivity correction data for the pixel arrays 2100 and 2101 of the CCD 4210, these data for each pixel array are stored. Thereafter, a reading unit 4207 is mechanically moved by a drive system (not shown) at a speed v in a direction indicated by an arrow m to scan the entire surface of the original. At this time, the maximum and minimum values of the original density of an image of the original 4630 which is read by the pixel array 2100 of the CCD 4210 are sampled by the signal processing unit 4211, thereby calculating a preset print density value for copy. Thereafter, the reading unit 4207 is mechanically moved by a drive unit (not shown) at a speed v in a direction indicated by an arrow n in FIG. 30 to return to the read start position, i.e., the home position.

(Copying of Original and Pattern Detection)

Figure 31:
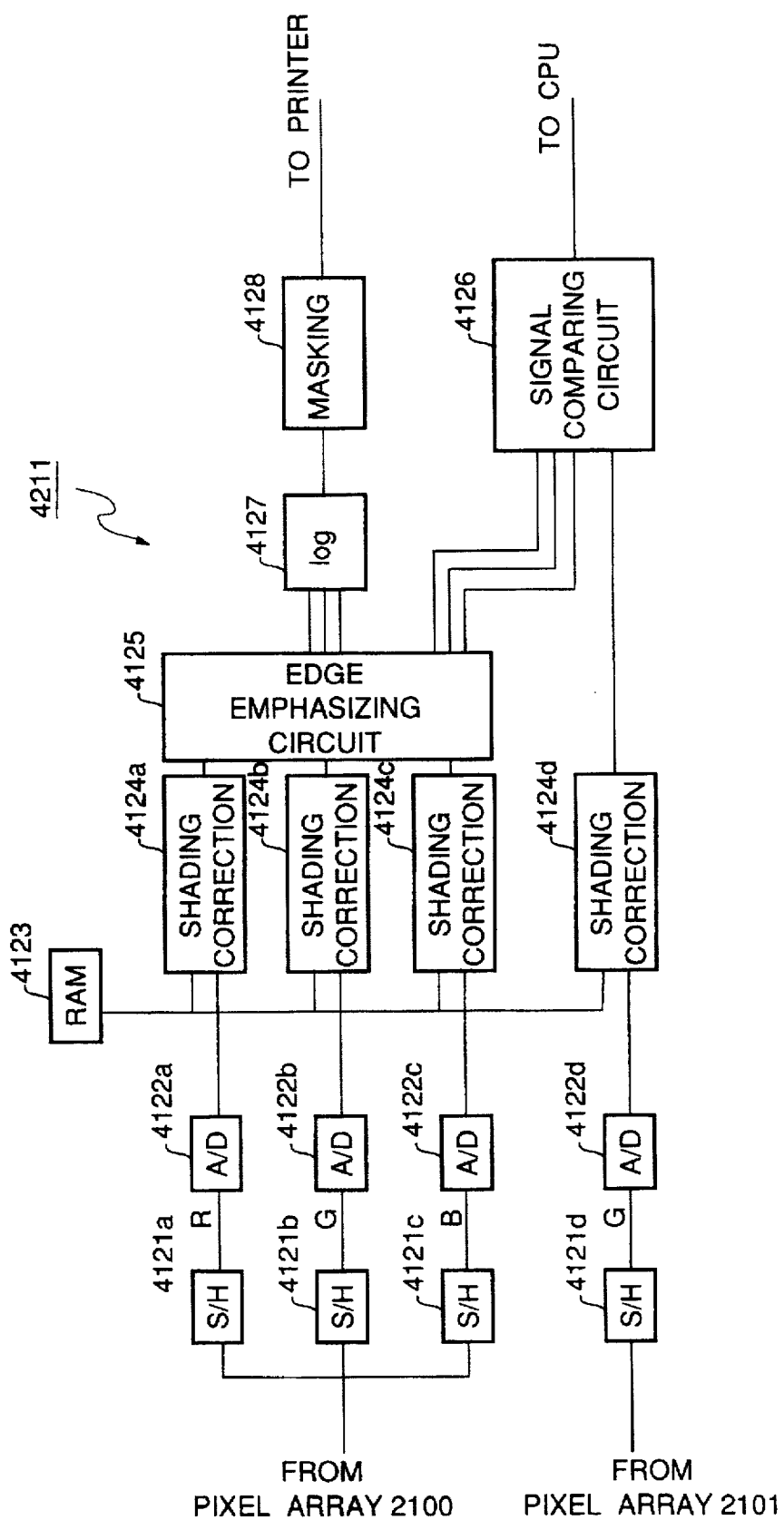
FIG. 31 is a block diagram of a signal processing unit 4211.

At the end of the shading correction data forming process, the reading unit 4207 returns to the home position to start reading the original 4630 and at the same time to start detecting the presence/absence of the pattern 4631 on the original 4630. The presence/absence of the pattern can be detected by comparing the read information from the pixel array 2100 of the CCD 4210 and the read information from the pixel array 2101 of the CCD 4210. The pixel array 2100 reads an image for reproduction, and the pixel array 2101 reads the image for detecting the pattern 4631. The read signals are processed. The operation of the signal processing unit 4211 will be described below. FIG. 31 is a block diagram of the signal processing unit 4211.

Figure 32:
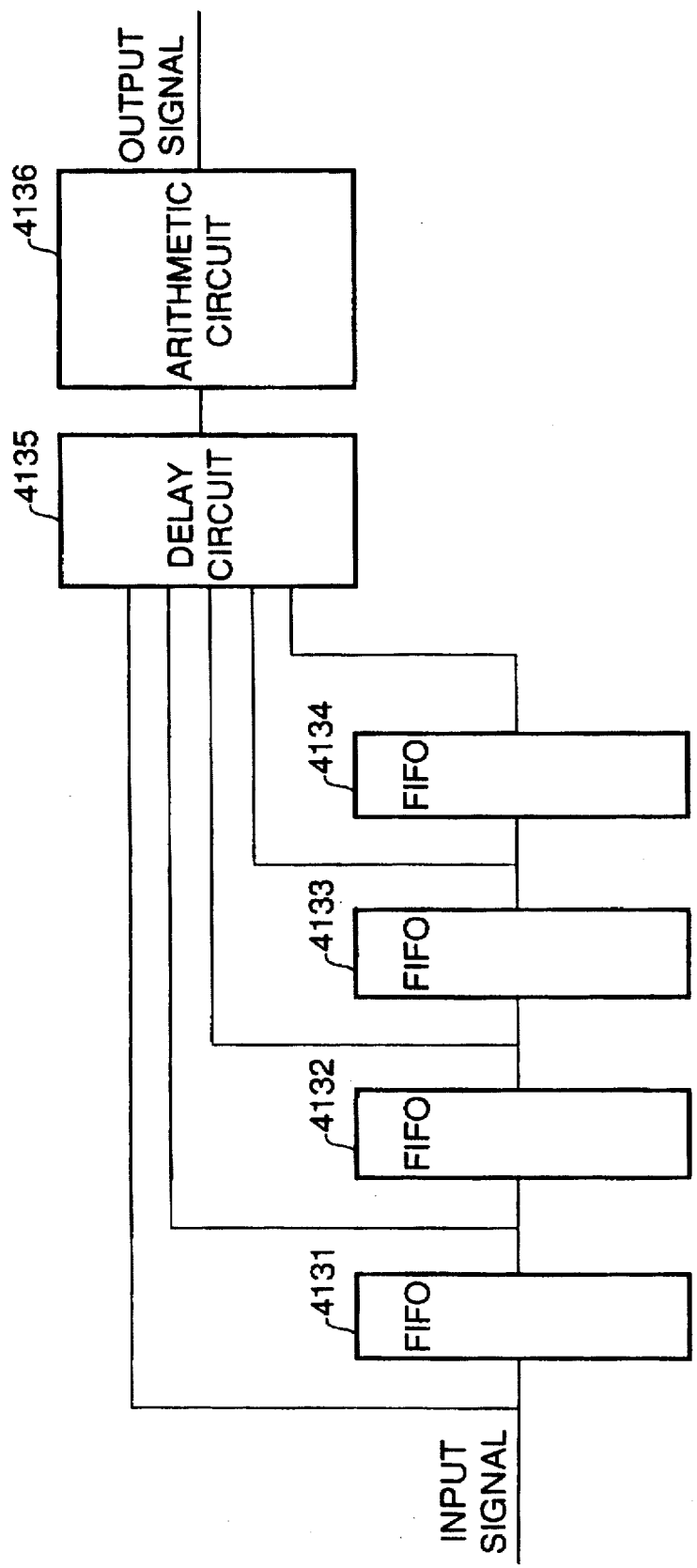
FIG. 32 is a block diagram of an edge emphasizing circuit.

A signal processing system for the pixel array 2100 will be described below. Analog image signals output from the pixel array 2100 are input in an order of R, G, and B components in synchronism with a drive signal of the CCD 4210. These image signals are simultaneously input to three sample/hold (S/H) circuits 4121a to 4121c. The sample/hold circuit 4121a generates a sample signal at a timing when the R signal is input and holds the analog level of the sampled signal until the next R signal is input. Similarly, the sample/hold circuit 4121b generates a sample signal at a timing when the G signal is input, and the sample/hold circuit 4121c generates a sample signal at a timing when the B signal is input. As a result, the sample/hold circuits 4121a to 4121c output the R, G, and B signals, respectively. These output signals are input to A/D converters 4122a to 4122c, and the A/D converters 4122a to 4122c convert the analog image signals into 8-bit digital image signals, respectively. These digital signals are input to shading correction circuits 4124a to 4124c and are subjected to shading correction. Shading correction is correction processing described in the previous part (prescanning). The resultant R, G, and B correction data are stored in a RAM 4123. Pixel correction data are sequentially input from the RAM 4123 to the shading correction circuits 4124a to 4124c during image reading, thereby performing data correction. Image signals output from the shading correction circuits 4124a to 4124c are input to a 5×5 edge emphasizing circuit 4125. The 5×5 edge emphasizing circuit (to be referred to as an edge emphasizing circuit hereinafter) 4125 emphases the edge of the read image. The edge emphasis can be realized by the following image processing. FIG. 32 is a block diagram showing the arrangement of the edge emphasizing circuit 4125. The edge emphasizing circuit performs edge emphasis for each color component, i.e., for each of the R, G, and B components. FIG. 32 shows a circuit portion for performing edge emphasis of one color component. Circuit portions for the remaining color components are the same as described above.

Figure 33:
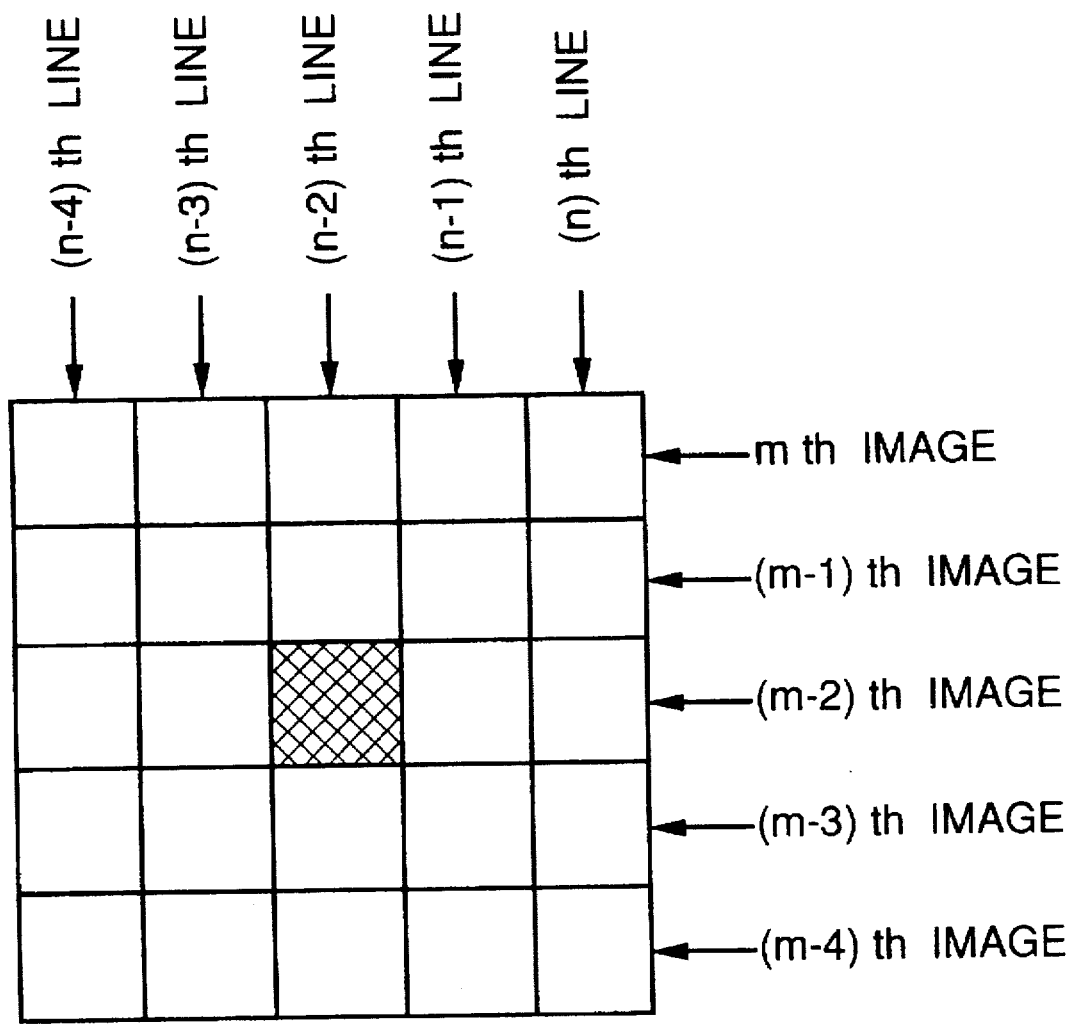
FIG. 33 is a pixel data map.

Referring to FIG. 32, each of FIFOs 4131 to 4134 has a capacity capable of holding one-line data from the pixel array 2100 of the CCD 4210. The four FIFOs are connected as illustrated in FIG. 32. When the FIFO 4131 receives the pixel array data of the nth line, the data of the (n−1)th, (n−2)th, and (n−3)th lines are output from the FIFOs 4132, 4133, and 4134, respectively. The input signal and the output signals from the FIFOs 4131 to 4134 are input to a delay circuit 4135. The delay circuit 4135 has several pixel delay elements for the mth pixel signal input for each line. The (m−1)th, (m−2)th, (m−3)th, and (m−4)th pixel data are input to an arithmetic circuit 4136 together with the mth pixel data. The arithmetic circuit 4136 receives a total of 25 pixel data. The map of the 25 input pixel data is shown in FIG. 33. The data of 24 neigboring pixels are input to the arithmetic circuit 4136 with respect to the target pixel indicated by a hatched square. The arithmetic circuit 4136 multiplies the data of the target pixel by 24, subtracts the data of the neighboring pixels except for the target pixel from the resultant product, and outputs a difference. That is, if the data obtained by multiplying the data of the target pixel by 24 is larger than the sum of the data of the neighboring pixels, the data of the target pixel is increased. If the data of the target pixel is smaller than the data of the neighboring pixels, the data of the target pixel is reduced. By this processing, the contrast of the edge of the edge emphasis is increased to emphasize the contrast of the reproduced image. The edge-emphasized image data is output to the printer unit through a log conversion unit 4127 for performing luminance-density conversion and a masking conversion unit 4128 for performing optimal correlation color correction. The signal processing system for the pixel array 2100 has been described. A signal processing system for the pixel array 2101 will be described below. This signal processing system is basically the same as that for the pixel array 2100. However, the signal processing system does not aim at image reproduction, and an edge emphasizing circuit is omitted therefrom. Data output from a shading correction circuit 4124d is input to a signal comparing circuit 4126. The other input data is an output from the edge emphasizing circuit. The data of the target pixel in the edge emphasizing circuit is data of the (n−2)th line, as is apparent from FIG. 33. The two-line distance shown in FIG. 27 is originally provided to compare the data from the pixel array 2100 with the data from the pixel array 2101. To eliminate a drawback caused by the two-line distance, a line buffer is required. However, since edge emphasis is performed for the data from the pixel array 2100, data obtained by reading the same part on the original are input. The signal comparing circuit 4126 sequentially compares the pixel data from the pixel arrays 2100 and 2101 and outputs a comparison result to a CPU (not shown).

Figure 28B:
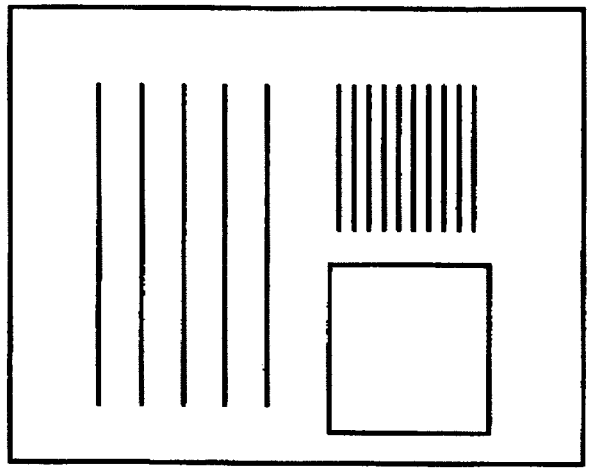
Figure 28C:
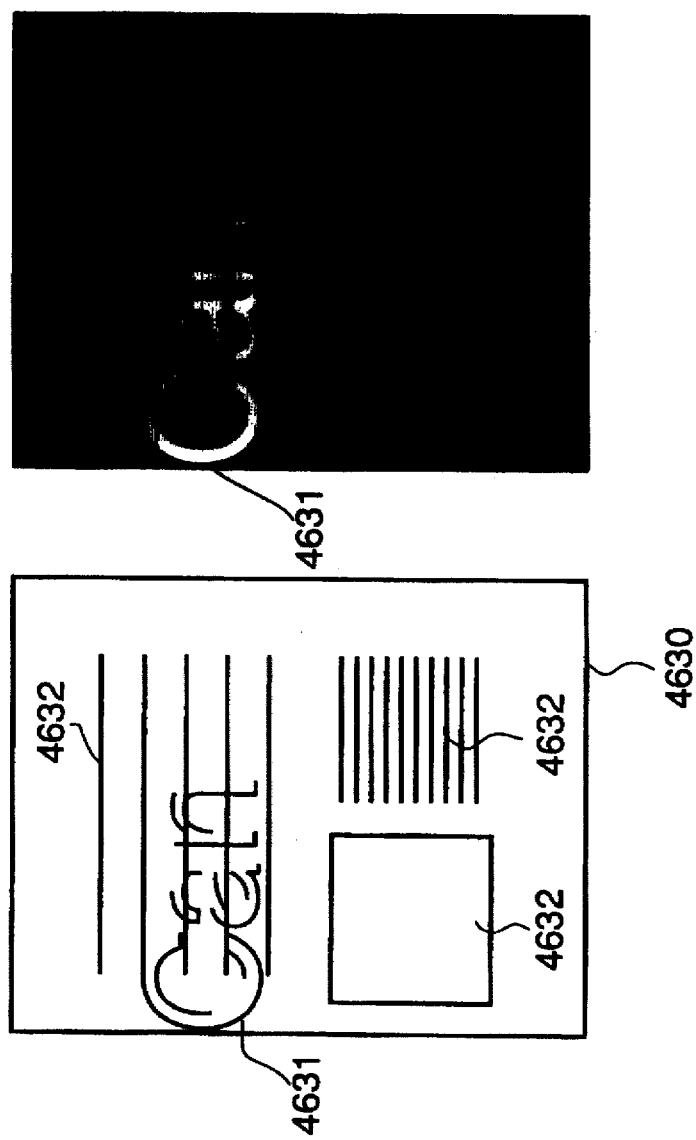

If the pattern 4631 is not present on the read original 4630, an image signal read by the pixel array 2101 of the color sensor 4210 is almost 100% black level, i.e., almost solid black. However, when the pattern 4631 is present on the original 4630, fluorescence is generated from the pattern 4631 to cause the pixel array 2101 to generate white data. A state in which the original 4630 including the pattern 4631 is read by the pixel array 2101 is shown in FIG. 28B, and a state in which the original 4630 including the pattern 4631 is read by the pixel array 2100 is shown in FIG. 28C. An output for the pattern 4631 from the pixel array 2101 has the white level, while an output for a remaining area 4633 has the black level. The signal comparing circuit 4126 can judge the presence of the pattern 4631 if the read data from the pixel array 2100 does not have the black level and the read data from the pixel array 2101 has the white level. When the number of pixels having the above levels reaches a predetermined number, a CPU (not shown) can control the printer unit 4202 to immediately stop copying the original.

In addition, when detection precision is taken into consideration, the pattern 4631 may be constituted by a plurality of specific marks, e.g., a plurality of concentric marks formed on the original. In this case, the direction of the original need not be considered. In addition, the presence/absence of a predetermined signal level (white level in this embodiment) can be detected, and at the same time pattern matching can be performed. The number of patterns can also be detected to further improve detection precision.

<Fifth Embodiment>

Figure 34:
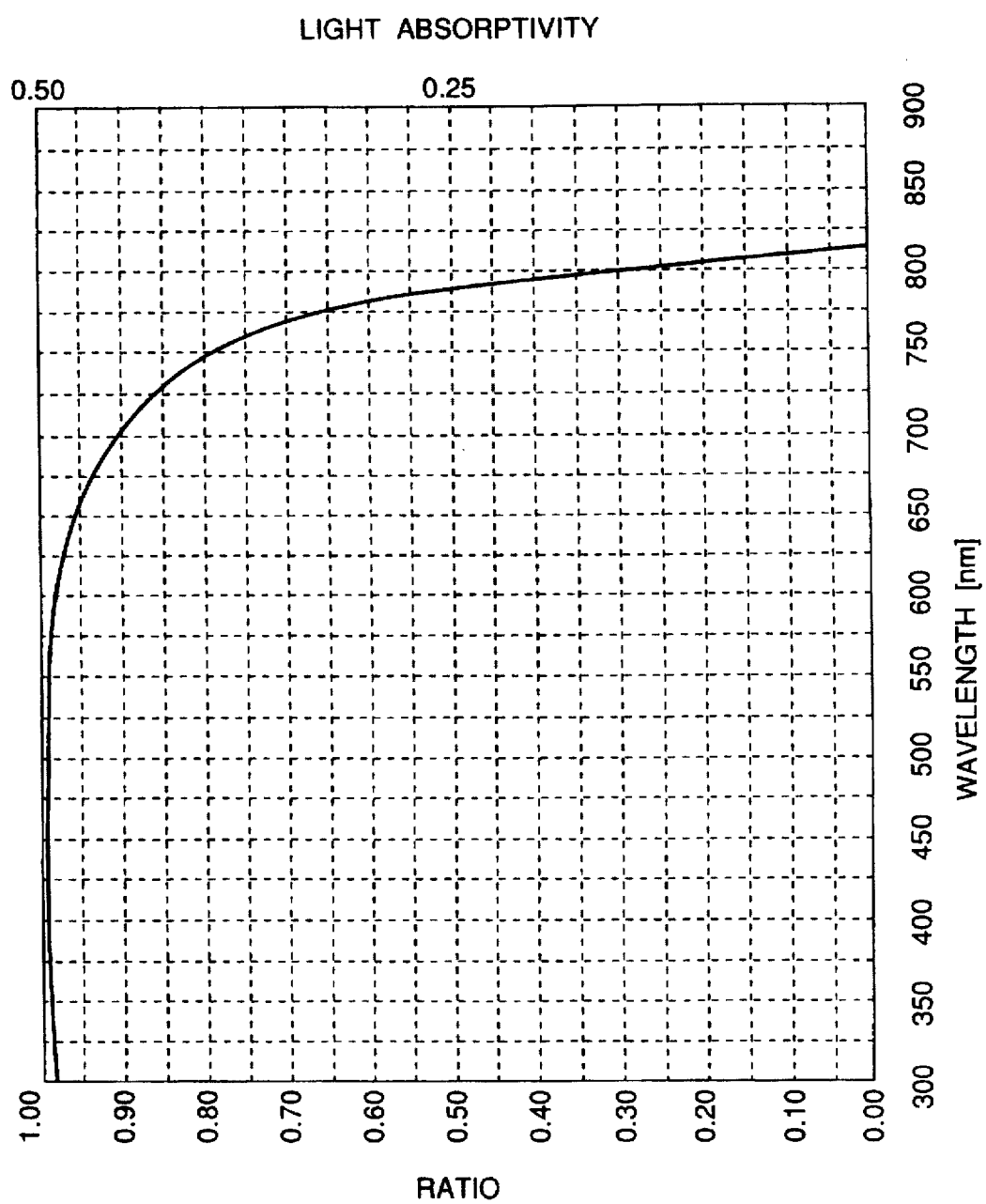
FIG. 34 is a graph showing the characteristics of a far-infrared cut filter.

The wavelength range detected by the pixel array 4101 is 700 nm or more in the above embodiment. The emission spectrum distribution of the infrared ink has a very narrow bandwidth having a peak of 800 nm, as shown in FIG. 29. An energy exceeding a wavelength of 1,000 nm may be provided depending on an illumination light source used. When such a light source is used, it is difficult to judge the fluorescence due to unnecessary energies of 800 nm or more. For this reason, a far-infrared cut filter having the characteristics shown in FIG. 34 is preferably inserted in the pixel array 2100. Since the far-infrared rays are already cut by the filter deposited on the pixel surface of the pixel array 2100, this far-infrared cut filter can be arranged at an arbitrary position in the optical path. For example, if the far-infrared cut filter is arranged in front of or behind the lens 4209, the filter can be easily exchanged even if the fluorescent characteristics of a fluorescent ink to be printed on the original are changed, thus resulting in convenience.

<Sixth Embodiment>

Figure 35:
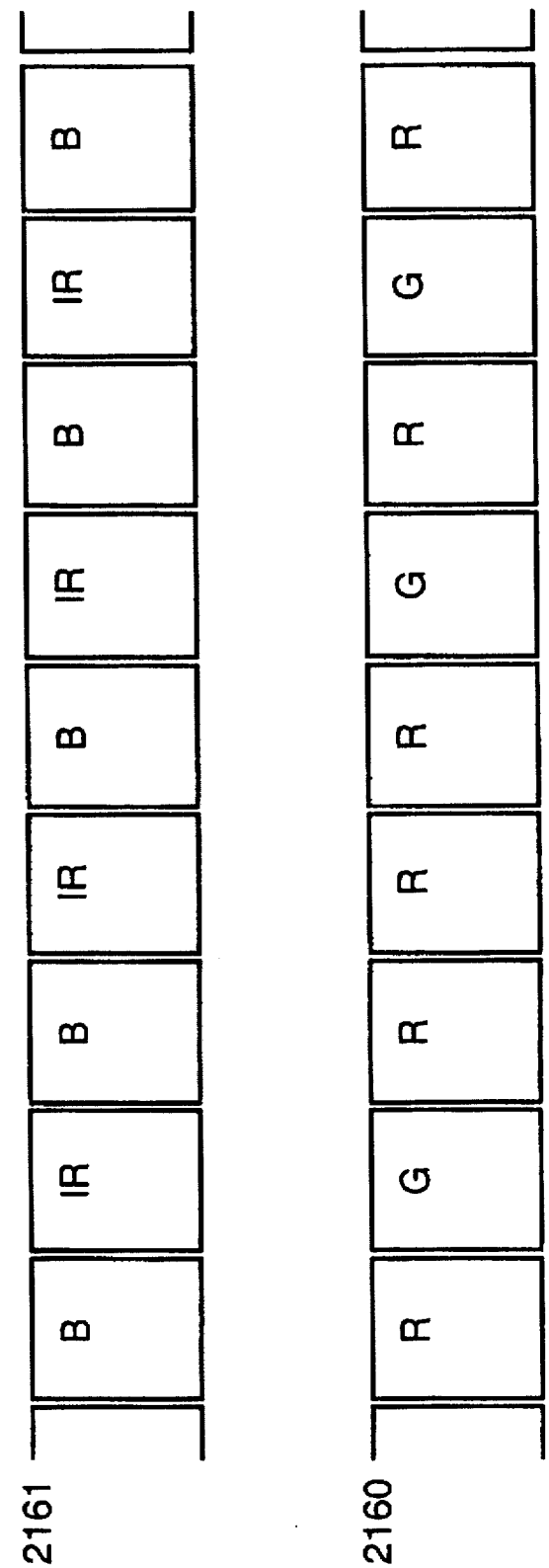
FIG. 35 is a view showing the structure of a color sensor according to the sixth embodiment.
Figure 36:
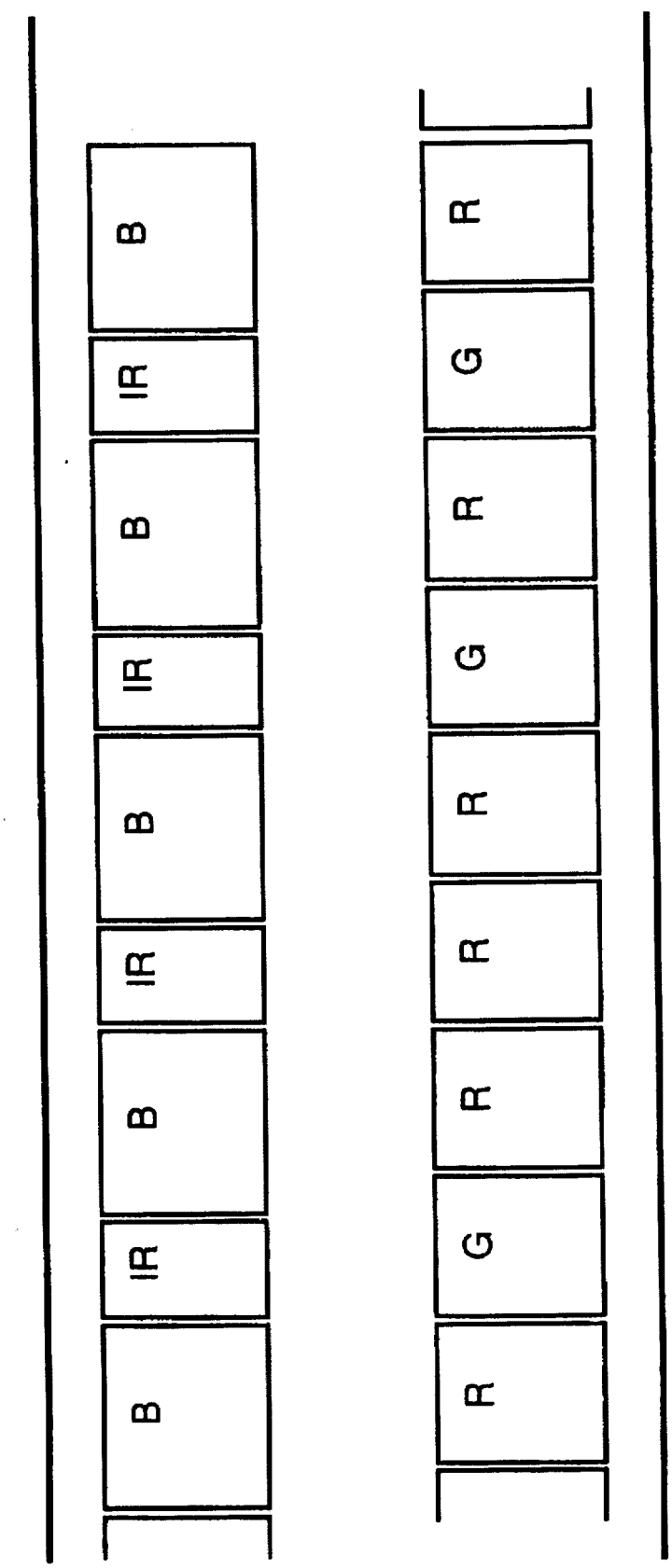
FIG. 36 is a view showing the structure of a color sensor according to the seventh embodiment.

The above embodiment has exemplified the structure of the color sensor shown in FIG. 23. However, the structure of a color sensor is not limited to the one shown in FIG. 23 if the color sensor has R, G, B, and IR sensors. For example, as shown in FIG. 35, R and G pixels may be arranged in a first line 2160 and B and IR pixels may be arranged in a second line 2161. In this case, the pixel sizes of the four types of pixels are equal to each other. This structure is preferable if the dynamic ranges of the four types of pixels can be set equal to each other depending on the characteristics of a light source. Since the dynamic range of a B pixel signal is generally narrow, the size of the B pixel may be set larger than those of the remaining pixels, as shown in FIG. 36.

<Seventh Embodiment>

In the above embodiments, the FIFOs used in the 5×5 edge emphasizing circuit are utilized to correct the line positions of the pixel arrays 2100 and 2101. However, line position correction need not be performed using the FIFOs in the edge emphasizing circuit. For example, any means may be used if an image processing circuit using a FIFO for error diffusion processing is used.

<Eighth Embodiment>

In the above embodiments, pattern judgment is performed by signal comparison in the signal comparing circuit. However, pattern matching may be performed in accordance with the shape of an image extracted as a result of signal comparison to control copying of the original. In this case, a pattern matching circuit becomes bulky and complicated. However, the types of originals can be judged in accordance with pattern shapes. Copying may be allowed for an inter-office original (confidential original) upon an input of a password, while copying may be inhibited for all securities.

As described above, in a reading system wherein a pattern preset with an infrared fluorescent ink is printed on a copy-inhibited original and an apparatus having an infrared reading means is provided on the copying machine side to read the original, a pixel array for reading invisible light information is arranged in a color sensor independently of a conventional color separation pixel array to simplify the optical path of the reading system. At the same time, the output dynamic range of the pixels for reading the infrared components can be increased. In addition, a distance between the pixel array for reading the infrared components and the pixel array for reading visible components is set to an integer multiple of the size of the read pixel of the reading system, so that the distance can be electrically corrected by a line buffer or the like. Comparison between signals from the two pixel arrays for reading data of the same area can be facilitated. In addition, FIFOs in an edge emphasizing circuit or the like are also used for correction of the distance between the read pixel arrays, thereby omitting the line buffer.

In the above embodiments, the pixel array for reading the visible light reads data prior to the read operation of the pixel array for reading the infrared components. For example, to generate 8-bit R, G, and B image data per pixel, the read operation of the pixel array for reading the IR components is performed prior to the read operation of the pixel array for reading the visible components, thereby reducing the capacity of the delay memory.

As a solid-state image pickup device, an amplification type device in which a capacitive load is connected to the emitter of a phototransistor, as described in U.S. Pat. No. 4,791,469 may be used in addition to a charge-coupled device (CCD) or a MOS type device.

According to the present invention, visible light and light except for the visible light can be read with a simple arrangement.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:

an image reading unit comprised of plural read pixel arrays and having (i) first detecting means for detecting invisible image information by part or all of a predetermined line of at least two lines of the read pixel arrays, and (ii) second detecting means for detecting visible image information of a pixel array of the read pixel arrays except for the predetermined line, wherein a distance between the pixel array of the predetermined line and the pixel array except for the predetermined line is an integer multiple of a pitch of pixels of at least two lines of the read pixel arrays;

judging means for judging a specific original on a basis of detection results of the first detecting means and the second detecting means; and control means for controlling image processing in accordance with a judgment result of said judging means, wherein a circuit for image processing is also used to output said invisible information synchronously with said visible information on a substantially same position on a read image.

2. An apparatus according to claim 1, further comprising processing means for performing predetermined processing of the visible image information detected by the second detecting means.

3. An apparatus according to claim 2, wherein the predetermined processing is edge emphasizing processing.

4. An apparatus according to claim 2, wherein the predetermined processing is error diffusion processing.

5. An image reading apparatus having photoelectric converting elements for reading visible information and invisible information, comprising:

detecting means in which said photoelectric converting elements are arranged on a common chip, for detecting light in accordance with image information; and shield means located adjacent to said detecting means, for shielding transmission of invisible light to said photoelectric converting elements, wherein said shield means is located at a position corresponding to said photoelectric converting elements for reading visible information.

6. An apparatus according to claim 5, wherein said shielding means is located at the position where the transmission of the invisible light to said photoelectric converting elements for reading the invisible light information is not shielded.

7. An apparatus according to claim 5, wherein said photoelectric converting elements for reading the visible information are arranged in a line on said common chip.

8. An apparatus according to claim 5, wherein said photoelectric converting elements for the visible information and the invisible information are each arranged in a line on said common chip, and an array of said photoelectric converting elements for reading the visible information and an array of said photoelectric converting elements for reading the invisible information are located parallel with each other.

9. An apparatus according to claim 5, wherein said photoelectric converting elements for reading the visible photoelectric information are for plural color components, and in comparison with a distance between said photoelectric converting elements of said plural color components, a distance between said photoelectric converting element for reading the visible information and said photoelectric converting for reading the invisible information is large.

10. An image reading apparatus having photoelectric converting elements for reading visible information and invisible information, comprising:

detecting means in which said photoelectric converting elements are arranged on a common chip, for detecting light in accordance with image information;

shield means located adjacent to said detecting means, for shielding transmission of invisible light to said photoelectric converting elements; and judging means for judging whether or not said image information is indicative of a particular image through the light in accordance with the image information detected by detecting means, wherein said shield means is located at a position corresponding to said photoelectric converting elements for reading the visible information.

11. An apparatus according to claim 10, further comprising control means for controlling formation of an image corresponding to said image information in accordance with the judgment by said judging means.

12. A reading apparatus comprising:

detecting means in which photoelectric converting elements for visible light and photoelectric elements for non-visible light are arranged on a same chip, for detecting light corresponding to an image;

first filter means, arranged near said detecting means, for transmitting specific visible light, for filtering other than the visible light; and second filter means, arranged near said photoelectric conversion elements at a position different from a position of said first filter means, wherein said first filter means and said second filter means are arranged at the positions corresponding to positions of said photoelectric conversion elements for visible light.

13. An apparatus according to claim 12, wherein said second filter means is arranged at the position where light other than said visible light to said photoelectric conversion elements for non-visible light is not filtered.

14. An apparatus according to claim 12, wherein said photoelectric conversion elements for visible light are arranged in line on said same chip.

15. An apparatus according to claim 12, wherein both of said photoelectric conversion element for visible light and said photoelectric conversion element for non-visible light are arranged in line on said same chip, and an array of said photoelectric conversion elements for visible light is parallel with an array of said photoelectric conversion elements for non-visible light.

16. An apparatus according to claim 12, wherein said photoelectric conversion elements for visible light correspond to a plurality of color components, and said photoelectric conversion element for visible light is apart from said photoelectric conversion element for non-visible light as compared with a distance between said photoelectric conversion elements for the plurality of color components.

17. An apparatus according to claim 12, wherein said photoelectric conversion elements for visible light are provided correspondingly to a plurality of color components, and a distance between said photoelectric conversion element for visible light and said photoelectric conversion element for non-visible light is an integer multiple of a distance between said photoelectric conversion elements for the plurality of color components.

18. An apparatus according to claim 12, further comprising judging means for judging whether said image is indicative of a specific image or not in accordance with the non-visible light detected by said detecting means, and control means for controlling image processing in which a signal corresponding to the visible light detected by said detecting means is used, in accordance with the judgment of said judging means.

19. An apparatus according to claim 18, wherein said control means controls the image processing according to the signal corresponding to said visible light.

20. An apparatus according to claim 18, wherein said control means controls image formation in which the signal corresponding to said visible light is used.

21. An apparatus according to claim 12, wherein said non-visible light is infrared light.

22. An apparatus according to claim 16, wherein said plurality of color components are a red component, a blue component, and a green component.

23. An apparatus according to claim 12, further comprising supplying means for supplying light corresponding to the image irrespective of the visible light and the non-visible light, to said detecting means.

24. An apparatus according to claim 12, further comprising illumination means for radiating light on said image for generating the light corresponding to said image.

25. An apparatus according to claim 12, further comprising an image forming apparatus.

26. An apparatus according to claim 12, wherein said reading apparatus is a part of a copying apparatus.

* * * * *